United States Patent
Campbell et al.

(10) Patent No.: US 11,914,855 B2
(45) Date of Patent: *Feb. 27, 2024

(54) METHODS AND SYSTEMS FOR MANAGING OPTICAL NETWORK SERVICES INCLUDING CAPACITY MINING AND SCHEDULING

(71) Applicant: Ciena Corporation, Hanover, MD (US)

(72) Inventors: Christiane Campbell, Ottawa (CA); Brian Choi, Ottawa (CA); Michael S. Wilgosh, Ottawa (CA); David W. Boertjes, Nepean (CA); Gerard L. Swinkels, Ottawa (CA); Tommaso D'Ippolito, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,213

(22) Filed: Nov. 3, 2022

(65) Prior Publication Data

US 2023/0125468 A1 Apr. 27, 2023

Related U.S. Application Data

(63) Continuation of application No. 15/886,204, filed on Feb. 1, 2018, now Pat. No. 11,507,262.

(Continued)

(51) Int. Cl.
| | |
|---|---|
| *G06F 3/04847* | (2022.01) |
| *G06F 3/0482* | (2013.01) |
| *H04B 10/27* | (2013.01) |
| *H04L 41/14* | (2022.01) |
| *H04L 41/22* | (2022.01) |
| *H04L 43/0882* | (2022.01) |
| *H04L 43/045* | (2022.01) |

(52) U.S. Cl.
CPC ........ *G06F 3/04847* (2013.01); *G06F 3/0482* (2013.01); *H04B 10/27* (2013.01); *H04L 41/14* (2013.01); *H04L 41/22* (2013.01); *H04L 43/0882* (2013.01); *H04L 43/045* (2013.01)

(58) Field of Classification Search
CPC ... G06F 3/04847; G06F 3/0482; H04B 10/27; H04L 41/14; H04L 41/22; H04L 43/0882; H04L 43/045; H04L 41/40
See application file for complete search history.

(56) References Cited

U.S. PATENT DOCUMENTS

| | | |
|---|---|---|
| 6,516,348 B1 | 2/2003 | MacFarlane et al. |
| 6,744,446 B1 | 6/2004 | Bass et al. |

(Continued)

*Primary Examiner* — Michael Roswell
(74) *Attorney, Agent, or Firm* — Baratta Law PLLC; Lawrence A. Baratta, Jr.

(57) ABSTRACT

Systems and methods include providing a user interface visualizing a current state of an optical network; receiving user inputs related to capacity mining in the optical network; determining a future state with the capacity mining based on the user inputs; and providing the user interface visualizing the future state. The future state can be presented with respect to a failed link and restoration of traffic on the failed link. The future state can include a plurality of plans with a visualization showing how much of the traffic is restored based on different approaches to the capacity mining. The capacity mining can include configuring optical modems based on determined available excess capacity.

20 Claims, 49 Drawing Sheets

Related U.S. Application Data

(60) Provisional application No. 62/462,239, filed on Feb. 22, 2017.

(56) References Cited

U.S. PATENT DOCUMENTS

| | | |
|---|---|---|
| 6,981,228 B1 | 12/2005 | Chen et al. |
| 7,149,975 B1 | 12/2006 | Johnson et al. |
| 7,185,075 B1 | 2/2007 | Mishra et al. |
| 8,015,289 B2 | 9/2011 | Hill et al. |
| 8,873,956 B2 | 10/2014 | Leung |
| 9,152,153 B2 | 10/2015 | Sullivan et al. |
| 9,392,462 B2 | 7/2016 | Raleigh et al. |
| 9,398,469 B2 | 7/2016 | Robson et al. |
| 9,851,726 B2 | 12/2017 | Ibrahim et al. |
| 10,162,319 B2 | 12/2018 | Klein et al. |
| 10,222,767 B2 | 3/2019 | Holaso et al. |
| 2003/0099014 A1 | 5/2003 | Egner et al. |
| 2003/0212588 A1 | 11/2003 | Brown |
| 2003/0216971 A1 | 11/2003 | Sick et al. |
| 2008/0108345 A1 | 5/2008 | Calin et al. |
| 2010/0138750 A1 | 6/2010 | Trinler |
| 2011/0055390 A1 | 3/2011 | Malloy et al. |
| 2012/0109719 A1 | 5/2012 | Parmar et al. |
| 2012/0131504 A1 | 5/2012 | Fadell et al. |
| 2013/0083693 A1 | 4/2013 | Himura et al. |
| 2013/0178986 A1 | 7/2013 | Lombard et al. |
| 2014/0045487 A1 | 2/2014 | Mustapha |
| 2014/0133859 A1 | 5/2014 | Fang et al. |
| 2014/0255024 A1 | 9/2014 | Frantz et al. |
| 2015/0229528 A1 | 8/2015 | Swinkels et al. |
| 2015/0333824 A1 | 11/2015 | Swinkels et al. |
| 2016/0182329 A1* | 6/2016 | Armolavicius ..... H04L 41/0895 370/230 |
| 2017/0353243 A1 | 12/2017 | Brueckheimer et al. |
| 2018/0314616 A1 | 11/2018 | Savolainen |

\* cited by examiner

FIG. 16

Capacity mining settings

General     Label: Plan B

Forecast Tolerance
- [✓] Reserve margin for repair loss

Reserve margin for:
- ( ) Full fill
- (●) Current/planned fill
  - [✓] Reserve margin for planned b/w (within ETTR window)
    - ETTR: 36 hrs
  - [✓] Restore whole capacity only Service impact
- [✓] Lock existing channels (within ETTR window)
- [ ] Allow pre-emption by service class Cancel    Update

FIG. 17

METHODS AND SYSTEMS FOR MANAGING OPTICAL NETWORK SERVICES INCLUDING CAPACITY MINING AND SCHEDULING

CROSS-REFERENCE TO RELATED APPLICATION(S)

The present disclosure is a continuation of U.S. patent application Ser. No. 15/886,204, filed Feb. 1, 2018, which claims priority to U.S. Provisional Patent Application No. 62/462,239, filed Feb. 22, 2017, and entitled "METHODS AND SYSTEMS FOR MANAGING OPTICAL NETWORK SERVICES INCLUDING CAPACITY MINING AND SCHEDULING," the contents of each are incorporated by reference herein in their entirety.

FIELD OF THE DISCLOSURE

The present disclosure generally relates to optical networking systems and methods. More particularly, the present disclosure relates to methods and systems for managing optical network services including capacity mining and scheduling.

BACKGROUND OF THE DISCLOSURE

Optical networks are moving from inefficient hardware-defined networks with complex control to software-defined approaches with centralized control, management, and end-to-end service orchestration. The software-defined approach, such as through Software Defined Networking (SDN), abstracts the complexity of underlying virtual and physical networks leading to an open, programmable, and automated approach. With this new approach, there are opportunities for network operators to revolutionize operations and business processes. Two conventional complex tasks in optical networks include capacity mining where software programmable optical modems are adjusted based on optimization to enable excess capacity without additional hardware and scheduling intermittent services across multiple layers. There is a need to leverage the emerging software-defined approach to perform this capacity mining and service scheduling efficiently.

BRIEF SUMMARY OF THE DISCLOSURE

In various embodiments, the present disclosure relates to methods and systems for managing optical network services including capacity mining and scheduling. In an embodiment, a method, apparatus, and computer-readable media provide a user interface for real-time capacity mining in a photonic network. The user interface can be used to recover as much dropped traffic as possible by mining available capacity in real-time. This mining process is a series of what-ifs that can be explored to determine available excess capacity. In another embodiment, a method, apparatus, and computer-readable media provide a user interface for accessing orchestrated services and scheduling intermittent/occasional capacity increases for the services that mine available photonic capacity in a multi-layer network. For example, the user interface can enable a mobile operator with existing orchestrated virtualized Evolved Packet Core (vEPC) (Mobile 5G) services to schedule an increased capacity for a selected service with a user-set start/stop time (making use of available spectrum in the core) to accommodate mobile capacity demands for a major localized event. All necessary changes to the photonic network, including manipulation of the spectrum would be orchestrated from an orchestrator down to the network with minimal user intervention.

In an embodiment, a computer-implemented method for managing optical network services in an optical network includes providing a user interface illustrating a current state of the optical network; performing analysis based on user input related to an event affecting the current state of the optical network to determine a first future state of the optical network; providing an updated user interface illustrating the first future state based on the analysis; performing an updated analysis based on updated user input received in response to the first future to determine a second future state of the optical network; and providing a further updated user interface illustrating the second future state. The computer-implemented method can further include causing changes in the optical network to implement the second future state in response to approval from an operator.

The first future state can have less optical margin in the optical network than the current state and the second future state can have less optical margin in the optical network than the first future state, and wherein an operator makes selections in the user input and the updated user input. The selections can be made to temporarily operate at the less optical margin based on the event and associated services affected by the event. The selections can be made based on a series of what if comparisons to explore excess capacity, services addressable by the excess capacity, and network conditions based on the excess capacity. The analysis and the updated analysis can perform capacity mining to determine excess capacity available based on the user input and the updated user input. The excess capacity can be provided through configuration changes in existing optical modems in the optical network. The analysis and the updated analysis can utilize currently deployed services and planned/scheduled services to determine the excess capacity. The event can include one or more faults with the first future state including the optical network subsequent to restoration of at least one service. The updated user interface and the further updated user interface can each list a number of services restored and down based on the first future state and the second future state. The event can include scheduling intermittent capacity increases on one or more services in the optical network.

In another embodiment, an apparatus configured to manage optical network services in an optical network includes a processor; and memory storing instructions that, when executed, cause the processor to provide a user interface illustrating a current state of the optical network, perform analysis based on user input related to an event affecting the current state of the optical network to determine a first future state of the optical network, provide an updated user interface illustrating the first future state based on the analysis, perform an updated analysis based on updated user input received in response to the first future to determine a second future state of the optical network, and provide a further updated user interface illustrating the second future state. The instructions that, when executed, can further cause the processor to cause changes in the optical network to implement the second future state in response to approval from an operator.

The first future state can have less optical margin in the optical network than the current state and the second future state can have less optical margin in the optical network than the first future state, and wherein an operator makes selections in the user input and the updated user input. The selections can be made to temporarily operate at the less optical margin based on the event and associated services affected by the event. The selections can be made based on a series of what if comparisons to explore excess capacity, services addressable by the excess capacity, and network conditions based on the excess capacity. The analysis and the updated analysis can perform capacity mining to determine excess capacity available based on the user input and the updated user input. The event can include one or more faults with the first future state including the optical network subsequent to restoration of all services. The event can include scheduling intermittent capacity increases on one or more services in the optical network.

In a further embodiment, a non-transitory computer-readable medium including instructions that, when executed, cause a processor to perform the steps of providing a user interface illustrating a current state of the optical network; performing analysis based on user input related to an event affecting the current state of the optical network to determine a first future state of the optical network; providing an updated user interface illustrating the first future state based on the analysis; performing an updated analysis based on updated user input received in response to the first future to determine a second future state of the optical network; and providing a further updated user interface illustrating the second future state.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 7-25 are User Interface (UI) screens illustrating a capacity mining operation;

DETAILED DESCRIPTION OF THE DISCLOSURE

Figure 1A:
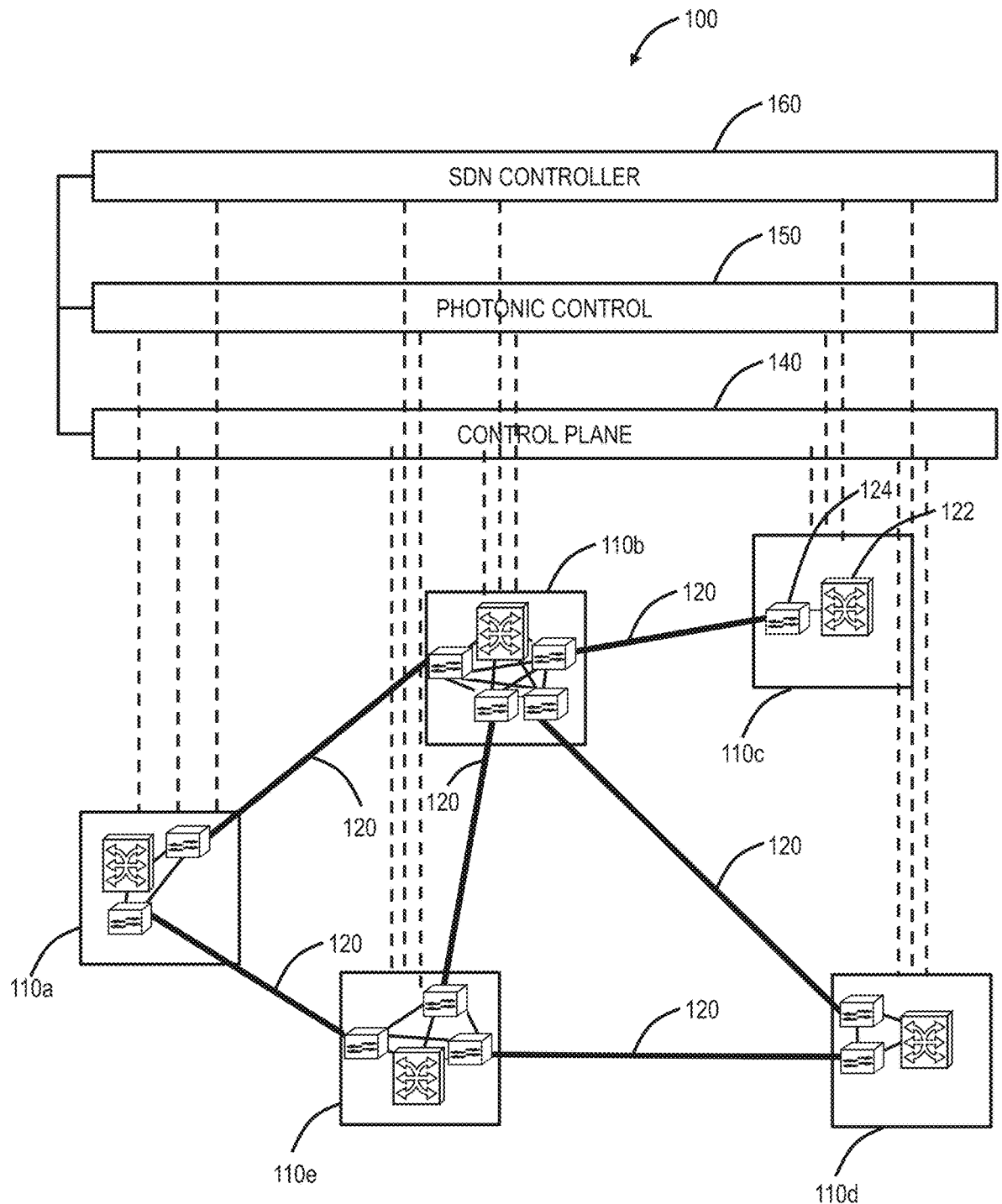
FIG. 1A is a network diagram of an example optical network with five interconnected sites.

Again, the present disclosure relates to methods and systems for managing optical network services including capacity mining and scheduling. In an embodiment, a method, apparatus, and computer-readable media provide a user interface for real-time capacity mining in a photonic network. The user interface can be used to recover as much dropped traffic as possible by mining available capacity in real-time. This mining process is a series of what-ifs that can be explored to determine available excess capacity. In another embodiment, a method, apparatus, and computer-readable media provide a user interface for accessing orchestrated services and scheduling intermittent/occasional capacity increases for the services that mine available photonic capacity in a multi-layer network. For example, the user interface can enable a mobile operator with existing orchestrated virtualized Evolved Packet Core (vEPC) (Mobile 5G) services to schedule an increased capacity for a selected service with a user-set start/stop time (making use of available spectrum in the core) to accommodate mobile capacity demands for a major localized event. All necessary changes to the photonic network, including manipulation of the spectrum would be orchestrated from an orchestrator down to the network with minimal user intervention In various embodiments, the methods and systems provide techniques for interfacing and performing capacity mining operations in an optical network. The methods and systems enable an ability to "dial-up" additional capacity through capacity mining through an intuitive and interactive user interface. The methods and systems enable operators to create multiple "what-if" plans to see the give and take associated with capacity mining, all performed offline allowing the operator to make informed decisions without impacting the network. Those skilled in the art will appreciate mining capacity requires network operation with less margin. Thus, operating with mined capacity is something that can be done in special circumstances, e.g., to reroute failed services, etc. Once a course of action is determined based on the capacity mining, and the chosen "what-if" plan is determined, the operator can push the plan to the network again through the user interface. The "what-if" plans can be based on user-selectable areas of the network shown via the user interface. The user interface can provide various visualizations to the operator to assist in the capacity mining operations including visualizations of the capacity mined, lists of affected services and customers, lists related to future network demands, etc. Also, the operator can override various options in the "what-if" plans, i.e., do this instead to make it better, or affect this customer/service and not this one, etc.

With respect to service assurance facilitation, specifically with respect to disaster recovery, the methods and systems enable "just in time"/"real-time" decision making by a service provider's Operations/Engineering departments. Operations personnel are informed which customers are affected by a disaster, for example: Which customers can be re-dialed? Which customers are grouped/muxed together and thus restored as a whole? Are there any planned "future" customers affected—can the operator borrow their spectrum for a short time to recover current customers from the disaster?

The user interface puts the Operations user in charge of the restoration risk, for example, restore the most important traffic/customers by accepting the new risk as the delta from the engineered network by manipulating, both fill and margin "levers" in the user interface. Operations can manipulate the variables manually on a case-by-case basis. It should be noted that methods and systems could also generate computed recovery options, based on pre-set policy(s).

The user interface lets an Operations user understand the impact of the "re-dial" decision across the network as a whole before committing to it. A continuous feedback loop, on the user interface, for "what-if" situations is provided. The user interface is used for capacity mining which makes previously non-viable links available (i.e., non-viable meaning these links have no capacity for services). This has two effects: capacity mining can turn previously non-viable paths into viable paths allowing services that were failed to be recovered, and capacity mining can be used to create more viable paths in the network (temporarily) under failure conditions. The operator could now choose to use them differently. They could ask the control plane to spread the services out over as many of these paths as possible (try to achieve equal fill instead of shortest path). By doing this, the operator is effectively spreading their risk across multiple links and thereby maximizing their ability to re-dial in the future.

With respect to temporary/short-term service fulfillment planning and scheduling without adding more equipment, the methods and systems can facilitate how to monetize the capacity mining, to squeeze more margin out of a Carrier's current resources and thus sell more services and increase revenue. The present disclosure describes an example relative to a 5G network. Another example could have the user plan a network in which links can be designated to support less than full fill and/or a more aggressive margin until such time as the new hardware can be purchased and installed in order to capture new business faster. For example, to provide temporary connectivity to a new data center faster than competitors until the additional equipment can be installed.

A Service Provider can easily go after one-time bandwidth guzzling events by using capacity mining to temporally change fill and margin to achieve this without relying on deploying additional/new equipment. For example, a major sporting event—a carrier can shift spectrum to crank up services for two months which typically does not have reserve fill/margin to accommodate increased bandwidth demands for all the media coverage then tear it down after the event and restore the original engineered network. For example, crank up wavelengths back to New York, Chicago, and Washington DC from the mid-west for a nationwide accounting company in April/May to accommodate the increased bandwidth demands during tax filing season. Those skilled in the art will appreciate there are various use cases and examples.

Optical Network

FIG. 1A is a network diagram of an example optical network 100 with five interconnected sites 110a, 110b, 110c, 110d, 110e, for illustration purposes. The sites 110 are interconnected by a plurality of links 120. Each of the sites 110 can include a switch 122 and one or more WDM network elements 124. The switch 122 is configured to provide services at Layers 1 (e.g., Optical Transport Network (OTN)) and/or Layer 2 (e.g., Ethernet, Multiprotocol Label Switching (MPLS)) and/or Layer 3 (e.g., Internet Protocol (IP)) where the switch would normally be called a router. For simplicity, it will be referred to as a switch in all cases. The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of ordinary skill in the art will recognize that the switch 122 and the WDM network elements 124 may be realized in the same network element. The photonic layer and the photonic control operating thereon can also include intermediate amplifiers and/or regenerators on the links 120 which are omitted for illustration purposes. The optical network 100 is illustrated, for example, as an interconnected mesh network, and those of ordinary skill in the art will recognize the network 100 can include other architectures, with additional sites 110 or with fewer nodes sites, with additional network elements and hardware, etc.

The sites 110 communicate with one another optically over the links 120. The sites 110 can be network elements which include a plurality of ingress and egress ports forming the links 120. Further, the nodes 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 includes a control plane 140 operating on and/or between the switches 122 at the sites 110a, 110b, 110c, 110d, 110e. The control plane 140 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 140 can utilize any type control plane for controlling the switches 122 and establishing connections.

The optical network 100 can include photonic control 150 which can be viewed as a control plane and/or control algorithm/loop for managing wavelengths from a physical perspective at Layer 0. In one aspect, the photonic control 150 is configured to add/remove wavelengths from the links in a controlled manner to minimize impacts to existing, in-service wavelengths. For example, the photonic control 150 can adjust modem launch powers, optical amplifier gain, variable optical attenuator (VOA) settings, wavelength selective switch (WSS) parameters, etc. The photonic control 150 can also be adapted to perform network optimization on the links 120. This optimization can also include re-optimization where appropriate. In an embodiment, the photonic control 150 can adjust the modulation format, baud rate, frequency, wavelength, spectral width, etc. of the dynamic optical transceivers in addition to the aforementioned components at the photonic layer. In an embodiment, the photonic control 150 can include support for capacity mining where the physical parameters are adjusted to provide increased capacity without requiring additional hardware. That is, the capacity mining supports an increase in capacity based on software and/or firmware provisioning of existing hardware, such as to change modulation format, baud rate, spectral occupancy, etc. This capacity mining can be based on network operating parameters, i.e., how much margin is available. For both the control plane 140 and the photonic control 150, associated controllers can be either centralized, distributed, or embedded in the network elements.

The optical network 100 can also include a Software Defined Networking (SDN) controller 160. SDN allows management of network services through abstraction of lower level functionality. This is done by decoupling the system that makes decisions about where traffic is sent (SDN control through the SDN controller 160) from the underlying systems that forward traffic to the selected destination (i.e., the physical equipment in the optical network 100). Work on SDN calls for the ability to centrally program provisioning by forwarding on the optical network 100 in order for more flexible and precise control over network resources to support new services. The SDN controller 160 is a processing device that has a global view of the optical network 100. Additionally, the SDN controller 160 can include or connect to SDN applications which can utilize the data from the SDN controller 160 for various purposes.

There are various techniques for data communications between the switches 122, the WDM network elements 124, the control plane 140, the photonic control 150, and the SDN controller 160 for Operations, Administration, Maintenance, and Provisioning (OAM&P) purposes. These various techniques can include one or more of Optical Service Channels (OSCs), overhead communication channels, in-band communication channels, and out-of-band communication channels. OSCs are dedicated wavelengths between WDM network elements 124. The overhead communication channels can be based on SONET, SDH, or OTN overhead, namely the Data Communication Channel (DCC) or General Communication Channel (GCC). The in-band communications channels and the out-of-band communication channels can use various protocols. Collectively, these techniques for an OAM&P communications network over in the network 100. The OAM&P communications network may employ switching and/or routing protocols to provide resilient communications to all network elements 122, 124 in the event of a failure (e.g., fiber cut or equipment failure).

In an embodiment, a controller is configured to communicate with other controllers in the network 100 to operate the control plane 140 for control plane signaling. This communication may be either in-band or out-of-band. For SONET networks and similarly for SDH networks, the controllers may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an embodiment, the controllers can include an in-band signaling mechanism utilizing OTN overhead. The General Communication Channels (GCC) defined by ITU-T Recommendation G.709 are in-band side channels used to carry transmission management and signaling information within Optical Transport Network elements.

Figure 1B:
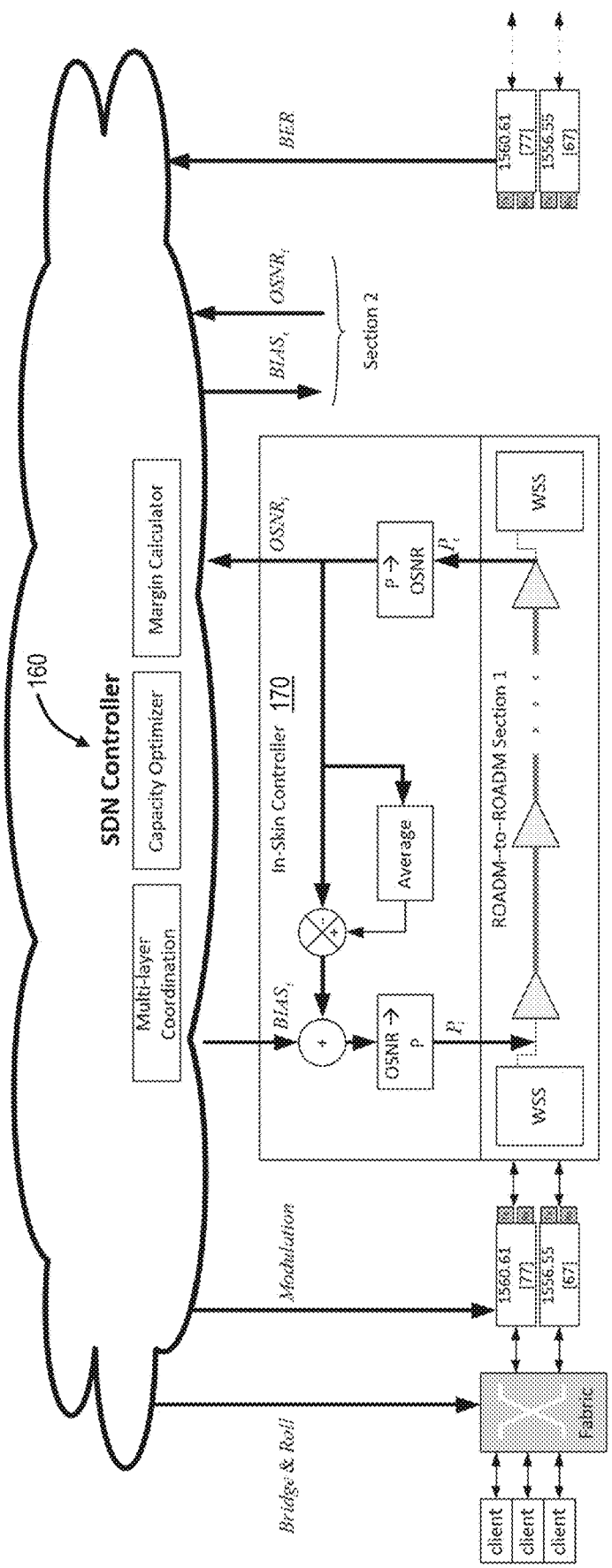
FIG. 1B is a network diagram of another example optical network illustrating additional details of the control plane, the photonic control, and the SDN controller in FIG. 1A.

FIG. 1B is a network diagram of another optical network illustrating additional details of the control plane 140, the photonic control 150, and the SDN controller 160.

Again, increasing demand for data bandwidth is challenging network operators to find new ways to monetize their network infrastructure. Previous work has focused on the ultimate capacity of networks in a static manner, driving the uncertainty out of the calculation of link budgets and therefore increasing the allowable capacity. Continuous capacity maximization promised to deliver more than these static methods but also drives the need for network reconfiguration. The SDN controller 160, with multi-layer coordination, is employed to solve this problem. This type of SDN controller 160 is different from those employed in pure digital networks like those at Layer 2, in that the Layer 0 SDN controller must play a part in margin determination and adjustment.

A field trial was performed in a long-haul fiber optic network with a link which was not dispersion compensating and included over 1000 km of Non-Dispersion Shifted Fiber (NDSF). Optical amplification only included Erbium-Doped Fiber Amplifiers (EDFAs) (no distributed Raman).

FIG. 1B illustrates a control scheme which was used in the field trial and which is applicable to the methods and systems herein. An in-skin controller 170 (associated with a network element) retrieves the per-channel power measurements, Pi, of channels transiting a ROADM to ROADM section (a section is all-optical). These per channel measurements are used to estimate the incremental Optical Signal-to-Noise Ratio (OSNR) for each channel, OSNRi. The in-skin controller 170 then attempts to equalize the OSNR of each channel to that of the average of all channels. The controller 170 is referred to as in-skin as it is part of the WDM network element 124. Of course, other embodiments are contemplated.

The function of margin adjustment in capacity mining is allowed by adjusting a per-channel OSNR bias, BIASi, which allows the SDN controller 160 to adjust individual channels up or down in power. This per-channel bias can also be used to fine-tune the system for the current operating conditions. For instance, in the absence of full-fill one can choose to separate wavelengths in the band thereby reducing the effect of Cross Phase Modulation (XPM). This results in a higher optimal launch power for the channel which can be achieved by adjusting the bias for that channel. The net result is that one can optimize the OSNR of the current set of channels with the aim to deliver additional capacity per transponder/modem. This is the function of a Capacity Optimizer module in the SDN controller 160 which ultimately controls the modulation format and therefore the capacity of the modems connected to the line system. The transponders can be optical modems which have flexible modulation formats.

Figure 1C:
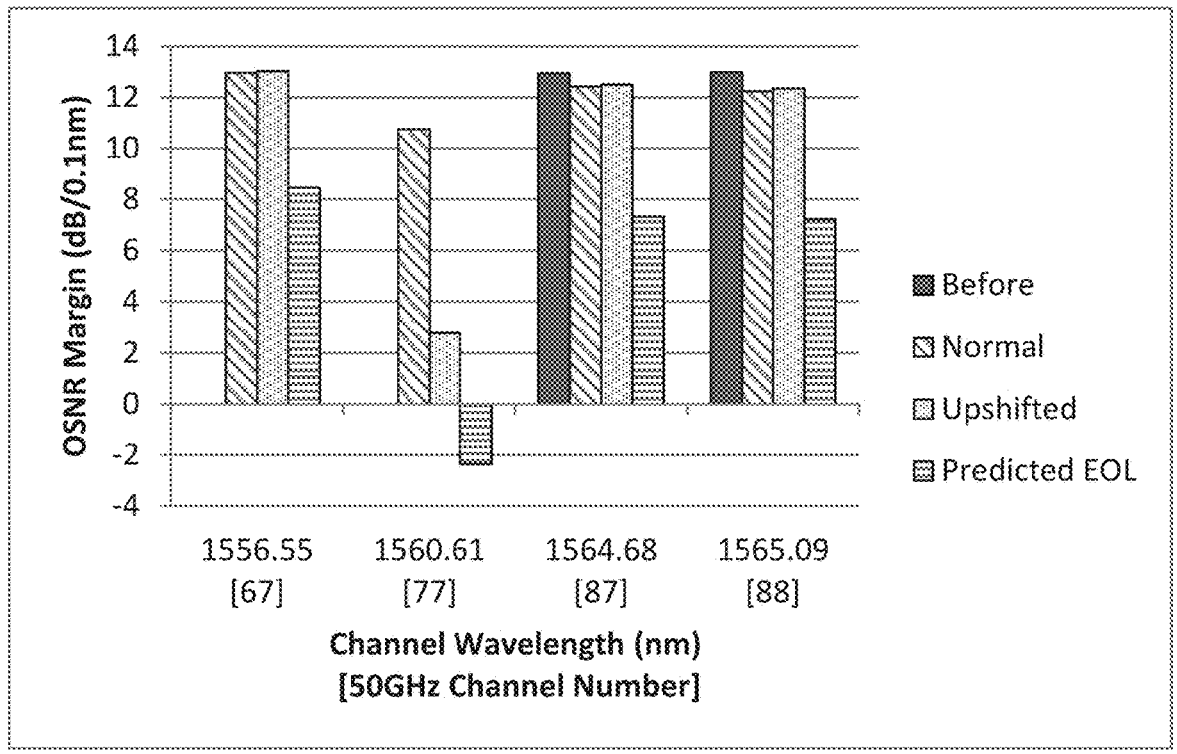
FIGS. 1C and 1D are graphs of Optical Signal-to-Noise (OSNR) margin at various points during an example operation of capacity mining.
Figure 1D:
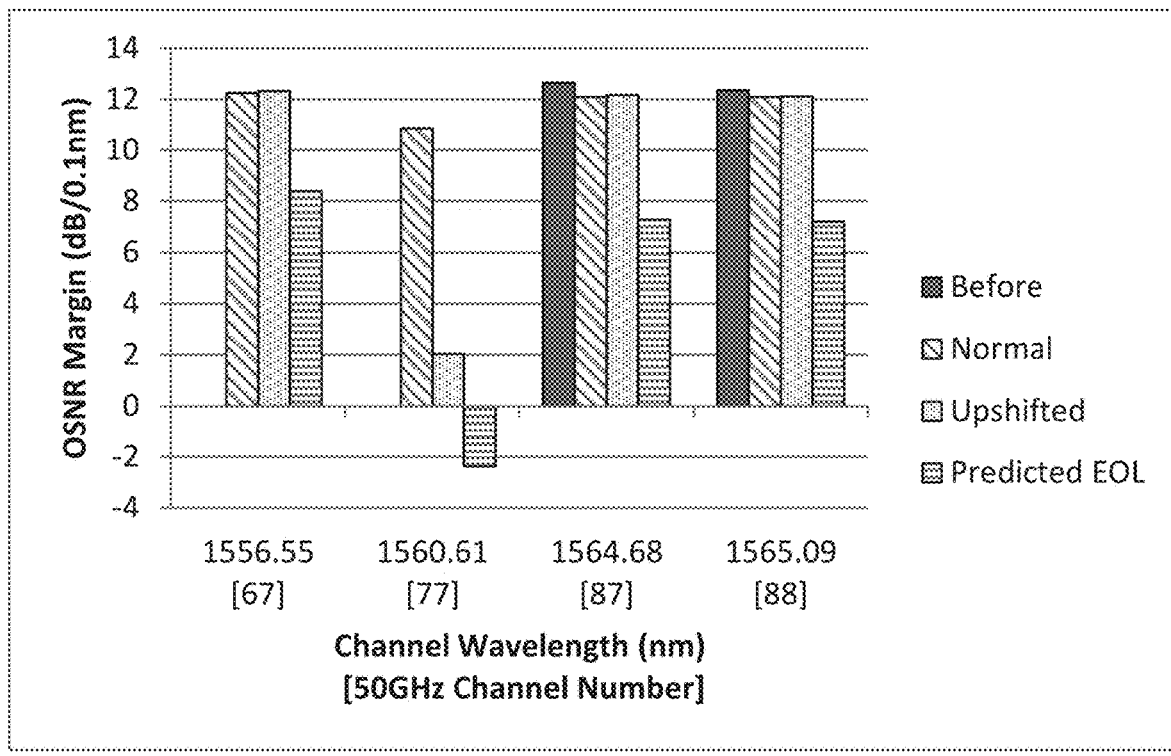

FIGS. 1C and 1D are graphs of OSNR margin at various points during an example operation of capacity mining. The solid bars labeled "Before" show the OSNR margin for the production traffic carrying channels 87 and 88 before channels 67 and 77 are added. The next bars, labeled "Normal," show the state of the margin with the four channels added—all operating at 100 Gbps, DP-QPSK (Dual Polarization—Quadrature Phase Shift Keying). The difference in OSNR delivered to channel 77 is due to the controller adding a −1 dB bias in anticipation of switching the modulation format to DP-16QAM (Dual Polarization—16-Quadrature Amplitude Modulation). The change in the OSNR margin of the pre-existing channels is small, averaging a drop of 0.5 dB. This is likely due to exploring more of the gain spectrum of the EDFAs. All channels have margins greater than 10 dB of OSNR. According to the end of life model, channel 77 does not have the adequate margin to support DP-16QAM, shown as negative margin in the bars labeled "Predicted EOL" (End of Life). However, the SDN controller 160 correctly predicts that under current conditions the 200 G format is viable. The following table shows the results of various calculations and the actual OSNR margin measured from a system in an example operation.

TABLE 1

OSNR margin results for a capacity maximization channel (dB)

| Direction | DP-QPSK | DP-16QAM EOL | DP-16QAM Predicted | DP-16QAM Actual |
|---|---|---|---|---|
| A-Z | 10.8 | −2.4 | 2.3 | 2.8 |
| Z-A | 10.9 | −2.4 | 1.7 | 2.0 |

The algorithms in the SDN controller 160 can successfully adjust the system to deliver an additional 100 Gbps of traffic capacity over the existing set of hardware at the expense of reduced margin.

Server

Figure 2:
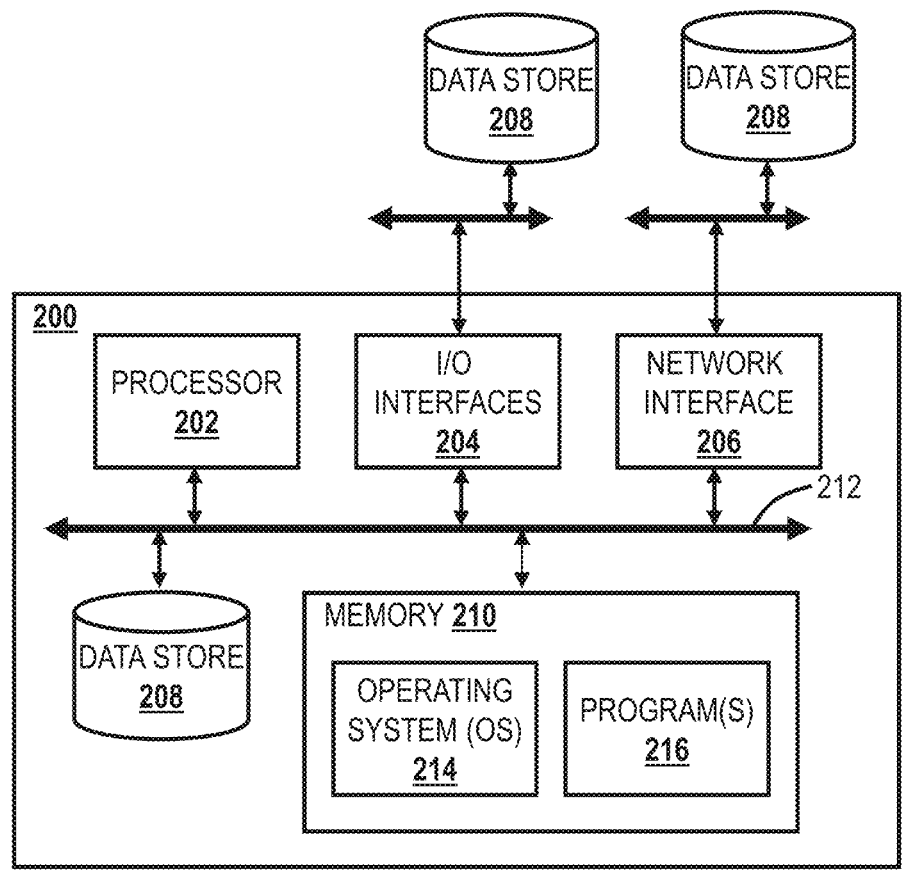
FIG. 2 is a block diagram of a server which may be used to implement a management system, the SDN controller in FIG. 1, etc.

FIG. 2 is a block diagram of a server 200 which may be used to implement a management system, the SDN controller 160, etc. In the systems and methods described herein, the server 200 can be used to present a User Interface (UI) or Graphical UI (GUI) to an operator for accomplishing the various processes described herein. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

The server 200 can be connected to the OAM&P communication network in the network 100, such as via the network interface 206. This connection provides a conduit through which the hardware in the network 100 can be programmed following instructions from the SDN controller 160, the control plane 140, and/or the photonic control 150.

Capacity Mining

Again, capacity mining includes using processes to determine how much margin is available to provide programmable changes to optical hardware (modems) to support additional capacity. In an embodiment, the systems and methods described herein present techniques to use this approach in the context of multiple network faults. Conventional protection techniques are available to recover from a single fault, such as network-based protection (mesh restoration), line protection (1:1, 1+1, ring, etc.), and the like. However, in the context of multiple faults, the conventional protection techniques may not be able to recover all lost traffic due to lack of excess capacity (i.e., non-viable links). In this context, the systems and methods provide an opportunity to use the capacity mining to recover as much capacity as possible intelligently.

A description of the techniques involved with capacity mining is included in commonly-assigned U.S. patent application Ser. No. 15/338,878, filed Oct. 31, 2016, and entitled "SYSTEMS AND METHODS TO INCREASE CAPACITY IN OPTICAL NETWORKS BASED ON EXCESS MARGIN," the contents of which are incorporated by reference. Also, capacity mining is offered by Ciena Corporation, the assignee of the present application, as "Liquid Spectrum."

Figure 3:
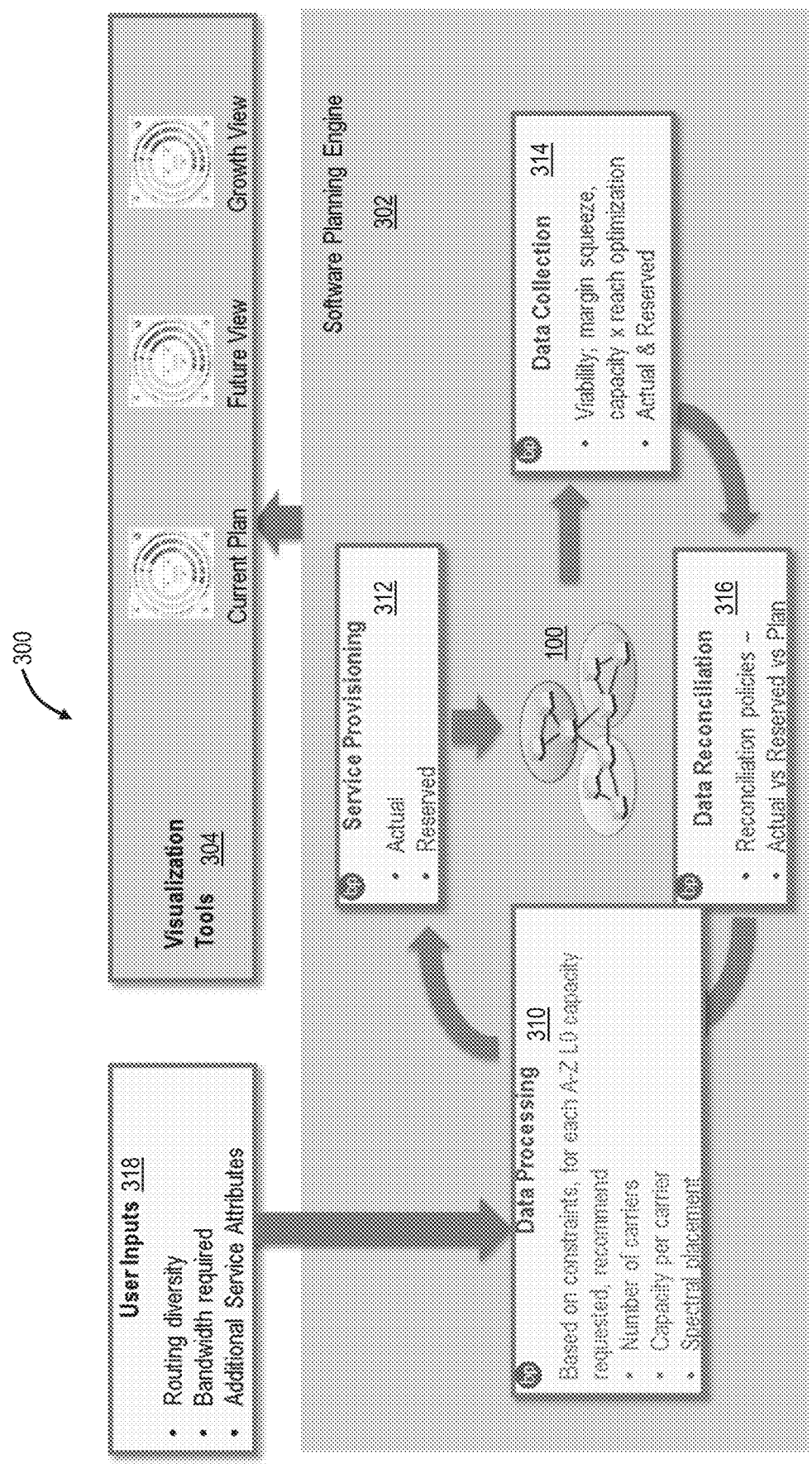
FIG. 3 is a flow diagram of a software-defined planning process for capacity mining.

FIG. 3 is a flow diagram of a software-defined planning system 300 for capacity mining. The systems and methods contemplate operation through the server 200 or multiple servers 200 in a cloud configuration along with interaction with the optical network 100. Aspects of the systems and methods include a software planning engine 302 and visualization tools 304. The visualization tools 304 are an end-user presented UI which provides the current plan, i.e., how the network 100 is currently configured, a future view, i.e., based on any proposed capacity mining changes, and a growth view, i.e., a future view taking into account any proposed capacity mining changes along with forecasted or planned future services. A key aspect of the systems and methods is the offline nature as these views in the visualization tools 304 show what would happen if the proposed capacity mining changes are implemented. This is a powerful "what-if" tool allowing operators to intelligently decide what proposed capacity mining changes to enact, fully understanding the risks and impacts.

The software planning engine 302 includes a data processing module 310, a service provisioning engine 312, a data collection engine 314, and a data reconciliation module 316. The data processing module 310 is configured to obtain user inputs 318 including routing diversity, bandwidth requirements, additional service attributes, etc. Generally, the software planning engine 302 is configured to take the current plan in the visualization tools 304 and generate the future view and/or the growth view based on the user inputs 318. Further, the software planning engine 302 can present additional data in the visualization tools 304 to enable an operator to understand the differences between the plans.

The data processing module 310 determines/recommends for each photonic service (i.e., a Layer 0 (L0) service from A-Z where A is the ingress network element and Z is the egress network element) a number of carriers, a capacity per carrier, and the spectral placement. That is, the data processing module 310 determines a configuration of each photonic service based on constraints (i.e., required margin, etc.). The data processing module 310 can provide data for photonic services to the service provisioning module 312 which can actually cause associated configuration changes in the optical network 100, including propagating changes via the control plane 140.

The data collection module 314 is configured to receive data from the optical network 100, such as OAM&P data. The data collection module 314 can also perform analysis to determine viability from a photonic perspective, margin availability, capacity versus reach optimization, etc. The data collection module 314 can connect to the data reconciliation module 316 for a reconciliation of the collected data versus policy and comparison of action versus reserved versus a plan. The data reconciliation module 316 can then connect to the data processing module 310.

Figure 4:
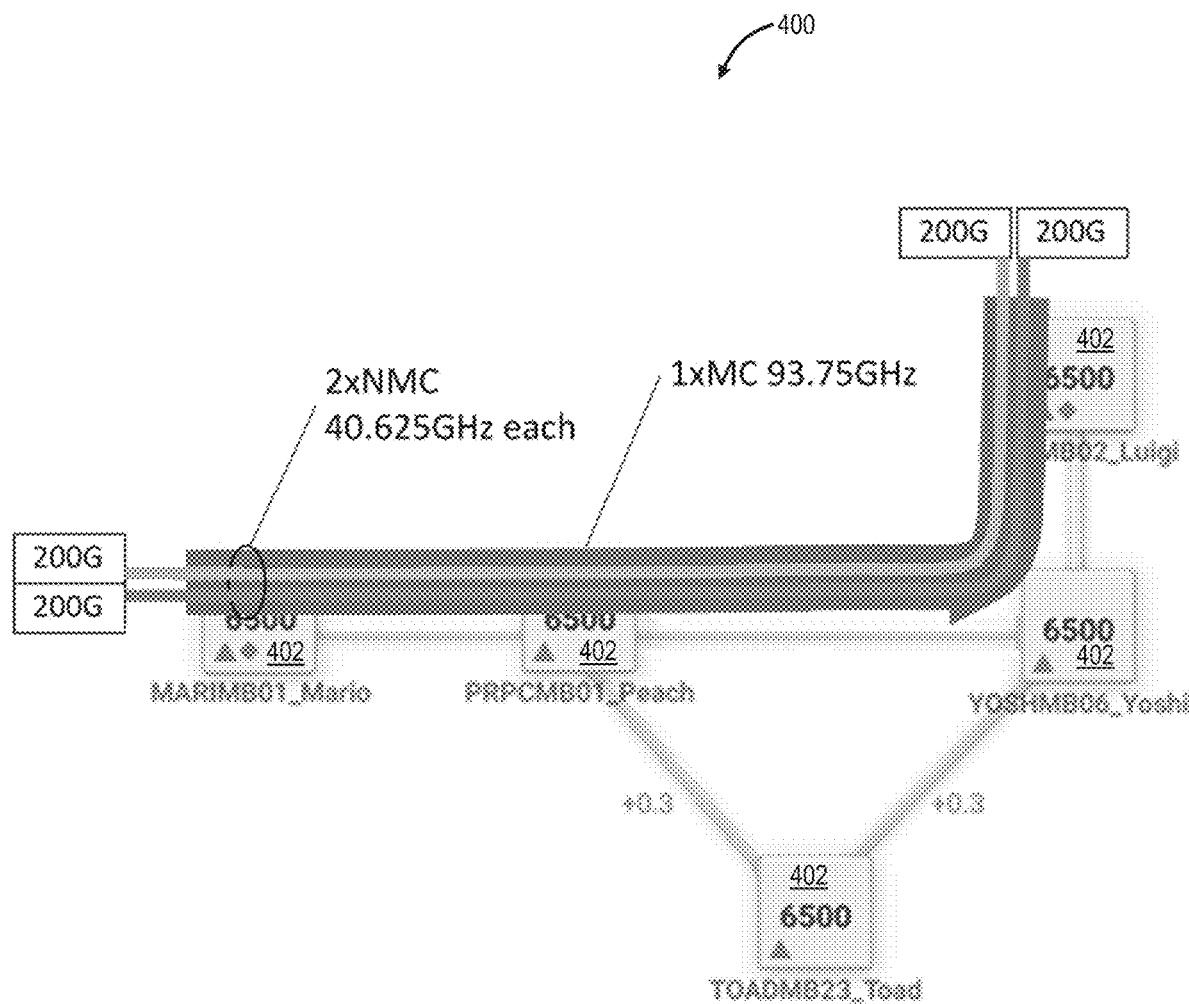
FIG. 4 is a network diagram of a network supporting flexible grid operation and capacity mining.

FIG. 4 is a network diagram of a network 400 supporting flexible grid operation and capacity mining. In an embodiment, optical network elements 402 can include a non-50 GHz Media Channel (MC) with 2×Network Media Channels (NMCs) being supported by it. For illustration, assume the traffic in FIG. 4 starts on the "short path" at 16QAM modulation format=400 Gbps. The network element topology and control software can support, for example, the 6.25 GHz granularity of MC, 0.001 GHz granularity of NMC boundaries, and 0.1 GHz granularity of transponder Fc. Routing can choose to change these arrangements, e.g., another path may have 2×1 NMC:1 MC and re-tune to the available spectrum.

Figure 5:
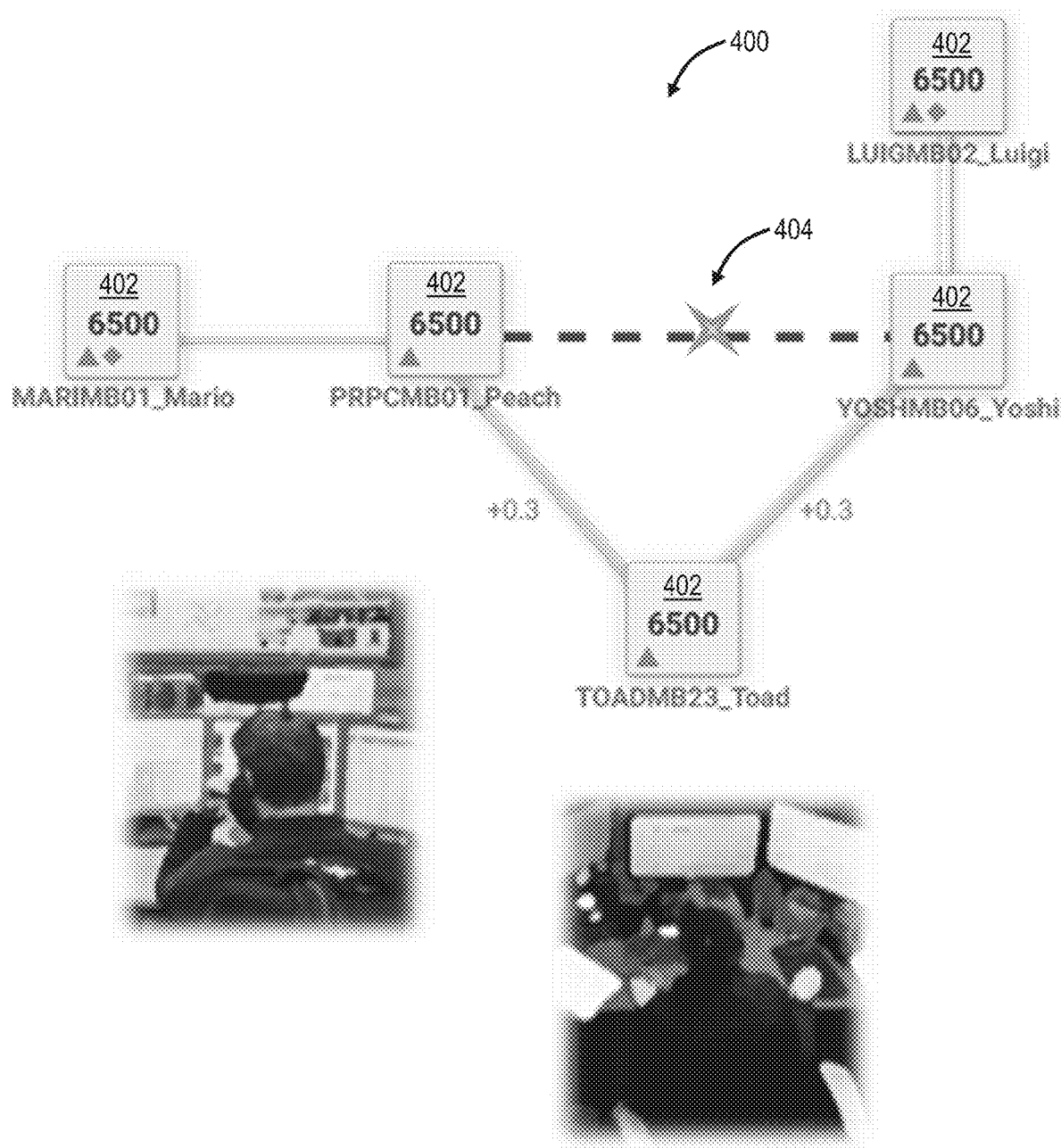
FIG. 5 is a network diagram of the network of FIG. 4 with multiple faults for illustration of the capacity mining.

FIG. 5 is a network diagram of the network 400 with multiple faults for illustration of the capacity mining. For example, assume a nodal failure (not shown) has consumed much of the protection and restoration capacity and a fiber cut 404 has caused some services to be lost. With the capacity mining process, an operator can mine the network 400 for additional capacity with the assumption that the operator is willing to take some risks (as long as they are known) with the goal of recovering traffic in view of the risks.

With respect to capacity mining and the optical modems, an option of "Restore whole capacity only" requires that each affected modem has the same capacity on the restoration path as it did on the home path. Note, often the restoration path is longer than the home path. This means that they have insufficient margin to be re-routed. Removing this margin restriction in the process allows the system to rescue at least part of this capacity. An option of "Lock existing channels (within an Estimated Time to Repair (ETTR) window)" stops the system from touching any carriers that are currently supporting services. Some channels, especially under the new conditions (not full fill, end of life), may have enough margin to make it to the next modulation format. Removing such restrictions allows the system to mine capacity from this excess margin.

Figure 6:
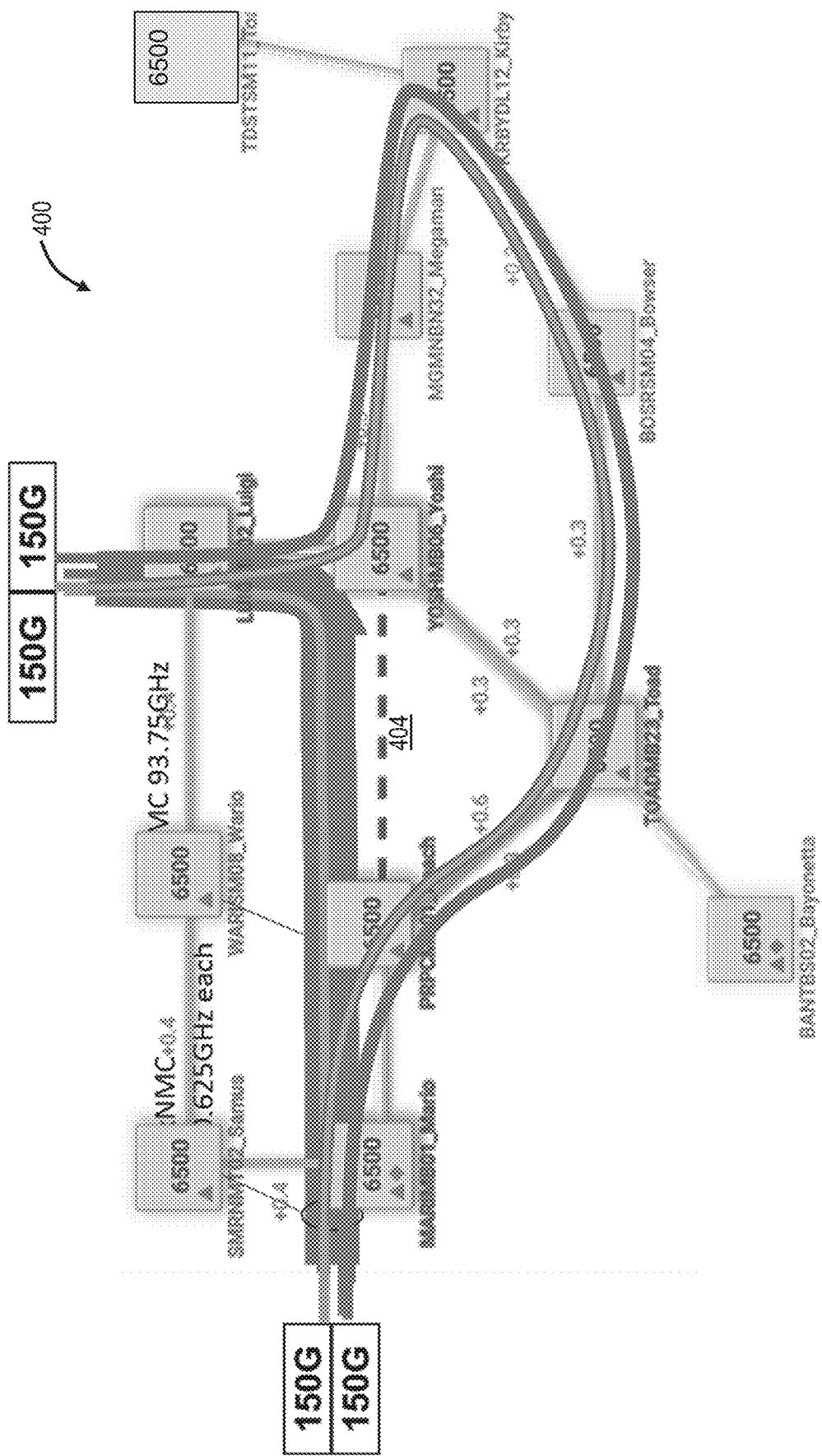
FIG. 6 is a network diagram of the network of FIGS. 4-5 after the multiple faults and with capacity mining.

FIG. 6 is a network diagram of the network 400 after the multiple faults and with capacity mining. Prior to the faults, the traffic started on the "short path" at 16QAM modulation format=400 Gbps, but there was a fiber cut 404 on that path. The NMC and MC are deleted on the home path, the capacity of the modems is changed from 200 G to 150 G (total goes from 400 G to 300 G), and a new route and spectral assignment is found—takes a longer route and needs to be routed 1NMC:1MC. That is, in this example, the longer path cannot support the 16QAM modulation format=400 Gbps from an optical perspective. However, by changing the capacity from 400 G to 300 G, the NMC and MC can be routed on a longer path to partially restore 75% of the services, i.e., 300 G of 400 G.

FIGS. 7-25 illustrate GUI screens related to a capacity mining operation. The capacity mining operation is described herein with reference to two personnel—a service assurance specialist and a planning engineer. For convenience, the capacity operation is now described with reference to this personnel and their actions. Those of ordinary skill in the art will recognize these two personnel are merely presented for illustration purposes and actual field implementations can be through a single person or three or more people as well as different roles, titles, responsibilities, etc.

The service assurance specialist can be a seasoned senior 3rd-line Service Assurance operations (Ops) specialist/supervisor who hands off/enlists the help of (2) the planning engineer to re-route/save services while OPs deals with fixing the fault and restoring normal operations. This distinction may be important because in today's telco operations, when a major fault disaster occurs, Operations (namely the service assurance specialist) usually makes the call to leave any disrupted traffic or services that could not automatically find a restore path DOWN (offline) rather than risk making the situation worse by trying to manually re-route traffic. OPs are skilled and concerned with fixing the fault as fast as possible in order to restore traffic and resume standard operations. The systems and methods described herein provides the OPs personnel with the added opportunity to enlist the aid of planning/engineering to safely come up with mitigation plans to restore some traffic while OPs worries about fixing/recovering from the disaster.

The following describe an example disaster recovery scenario as follows—a major fault existed in the network and now a second major fault has occurred (a fiber cut). The service assurance specialist has come to Operations to assess the worsening situation. All the automatic protection mechanisms have kicked in but there are still many major alarms and key customers out of service. The NOC is aware the outages are going to last for some time, so they will enlist the planning/engineering team to see if there are additional options for restoring services to key customers, as soon as possible. There may also be other personnel—a supervisor (most likely a Director of transport) who would assess the mitigation plans (what-if solutions) that the planning engineer comes up with and they will decide whether to execute a mined capacity restoration plan or not.

Here, the capacity mining operation is a collection "what if" scenarios to determine how best to address failed capacity. The service assurance specialist and the planning engineer can use the software-defined planning system 300 and specifically the visualization tool 304 to perform the various steps described herein. That is, the various GUI screens can be part of the software-defined planning system 300. The GUI screens from the software-defined planning system 300 can use a Hypertext Markup Language (HTML) web-based approach that allows multiple users of the software-defined planning system 300 to share information and data views between themselves in real-time by simply sharing a URL; providing, of course, that each user has similar security clearances and assigned permissions and capabilities. This is most relevant to the disaster recovery scenario where the service assurance specialist in NOC hands off the same fault view to the planning engineer in the back office of the telco.

Figure 7:
Figure 8:
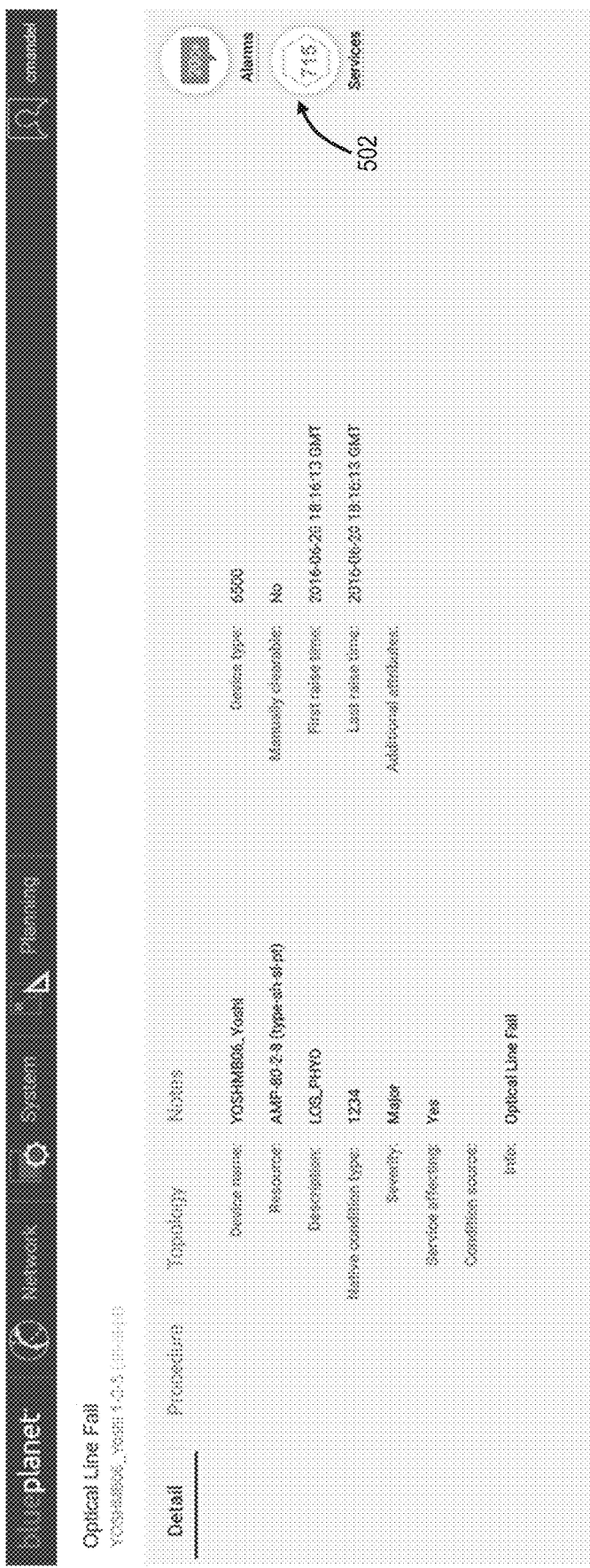
Figure 9:

Assume multiple faults occur and FIG. 7 illustrates an alarm screen based thereon. From FIG. 7, the service assurance specialist recognizes the faults and the impacted services. Specifically, the service assurance specialist locates an alarm 500 labeled "Optical Line Fail" which is the 8$^{th}$ from the top of the list and the service assurance specialist selects it (e.g., click on, etc.) bringing up a details screen shown in FIG. 8. The details screen provides service assurance specialist details of the alarm 500. The service assurance specialist selects a "Services" button 502 to view the affected services which are shown in FIG. 9.

In this example, the service assurance specialist recognizes that the alarm 500 has brought down traffic belonging to a key customer: Gaspar Corp. and the service assurance specialist needs to recover Gaspar's traffic and buy some time to fix the actual fault. Thus, in this example, the capacity mining process is illustrated with the objective of finding excess capacity for the key customer. The service assurance specialist and the planning engineer will use the software-defined planning system 300 to find this excess capacity and cause configuration changes in the optical network 100 to realize the plan.

Figure 10:
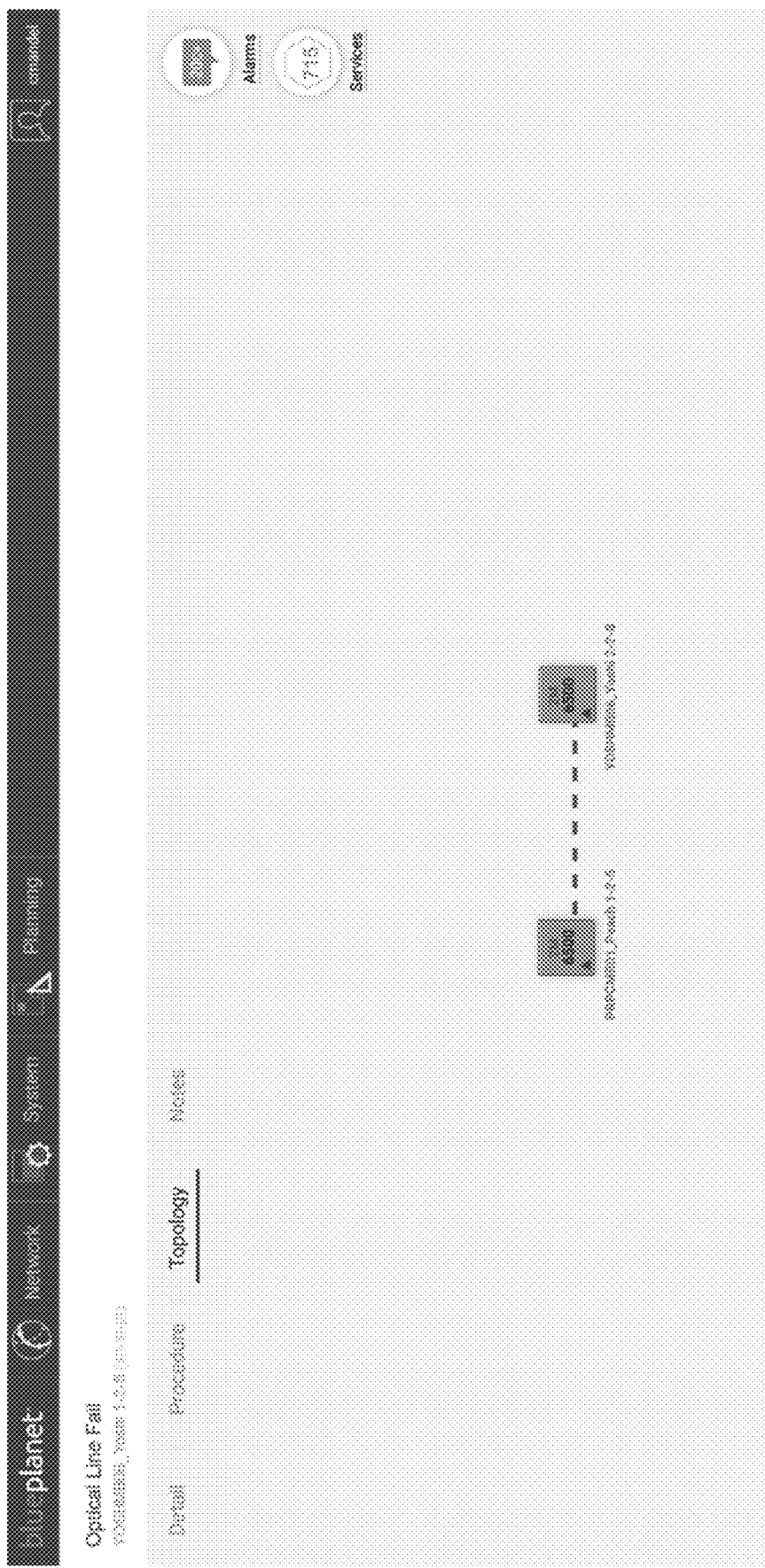

The service assurance specialist selects the "Topology" tab on the tab bar, and this screen is shown in FIG. 10. In the capacity mining process, the service assurance specialist is going to enlist the planning engineer to help recover Gaspar's traffic to buy some time to repair the fault. This can include the service assurance specialist messaging the planning engineer such as sending a Uniform Resource Locator (URL) or some other notification to the planning engineer. At this point, the planning engineer opens the URL and has a shared instance with the technician, providing similar views in the software-defined planning system 300 with specific capabilities for the planning engineer based on her role.

Figure 11:
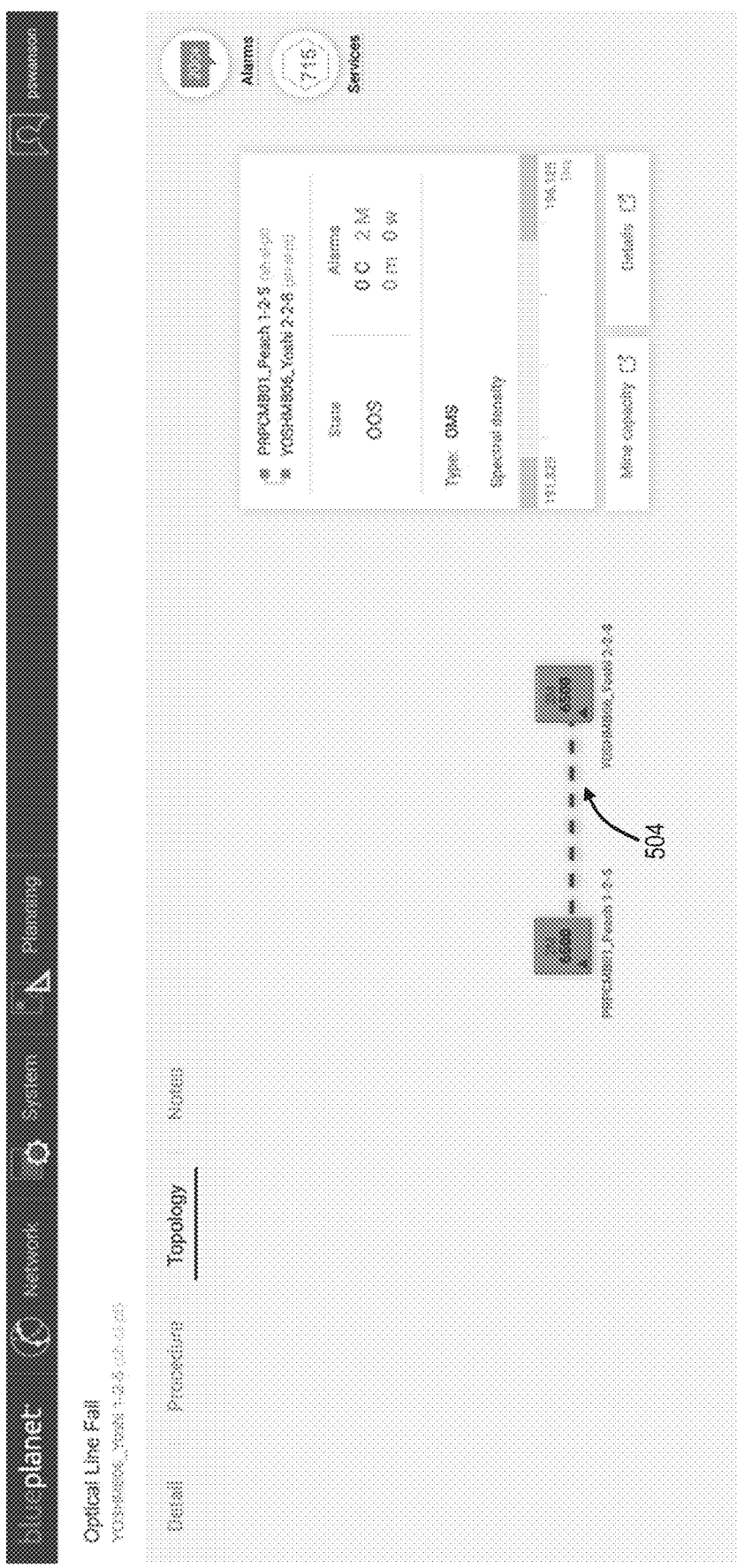

The planning engineer clicks on a broken link 504 between the two network elements on the topology screen of FIG. 11. The planning engineer has access to a "real-time capacity mining" application (note, the service assurance specialist may not have access based on his role). Thus, in this example, the capacity mining process must be performed by the planning engineer. Those skilled in the art will recognize other implementations and roles are contemplated.

Figure 12:

A "real-time capacity mining" application 510 is illustrated in FIG. 12. The application 510 can be implemented through the software-defined planning system 300. The "real-time capacity mining" application 510 opens based on a context of the failed link (YOSHMB06_Yoshi_PRPCMB01_Peach) and focuses on the services that were originally crossing that link. That is, the UI screen in FIG. 12 for the application 510 lists the services affected by the failed link.

The "real-time capacity mining" application 510 is a what-if scenario comparison application that enables the operator (e.g., the planning engineer) to develop a plan and then cause implementation of the plan in the optical network 100. Note, in this example, the Yoshi-Peach link 504 is down, 106 services are still up (meaning found restoration path), and 609 services are down (for example incapable of finding a viable restoration path); the left-side list are up services, right-side list are down services; both lists can scroll. Thus, the fault on the broken link 504 causes 609 services to be down, and there is not sufficient capacity in the optical network 100 to restore any of these 609 services.

At this point, the optical network 100 is operating at a baseline, i.e., status quo, without capacity mined. That is, at this point, the optical network 100 is at the current plan in the visualization tools 304. This baseline assumes the end of life (EOL) and full fill margins on all photonic links. These assumptions are extremely conservative and appropriate for the normal operation. However, it would be advantageous to operate less conservative until the broken link 504 is fixed.

Figure 13:
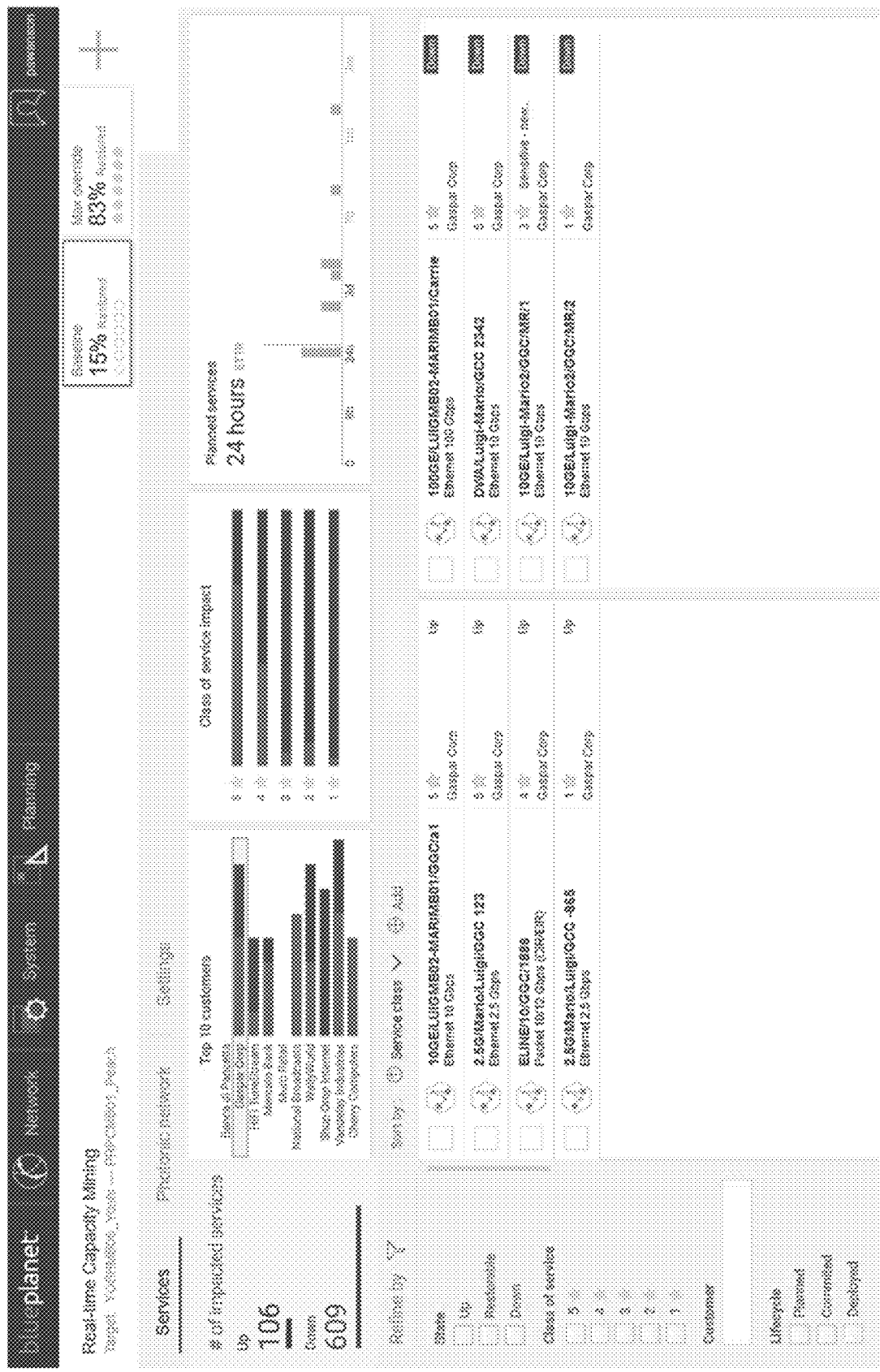
Figure 14:
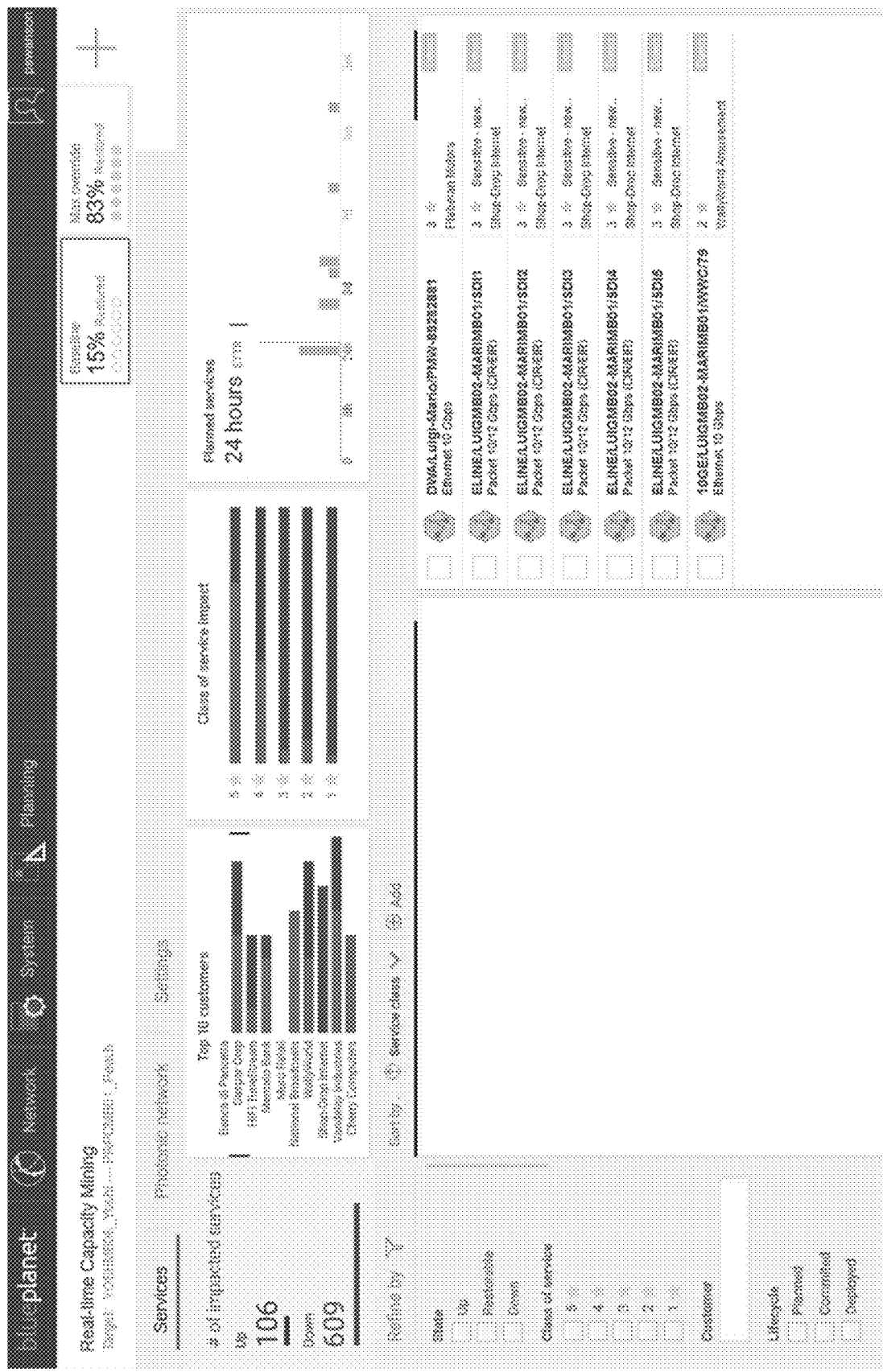

FIG. 12 also has visualizations showing impact such as the "Top 10 customers" which can be clicked on to show the services for Gaspar Corp. (FIG. 13). The "Planned Services" chart can be clicked on to list the affected planned services (FIG. 14).

Figure 15:
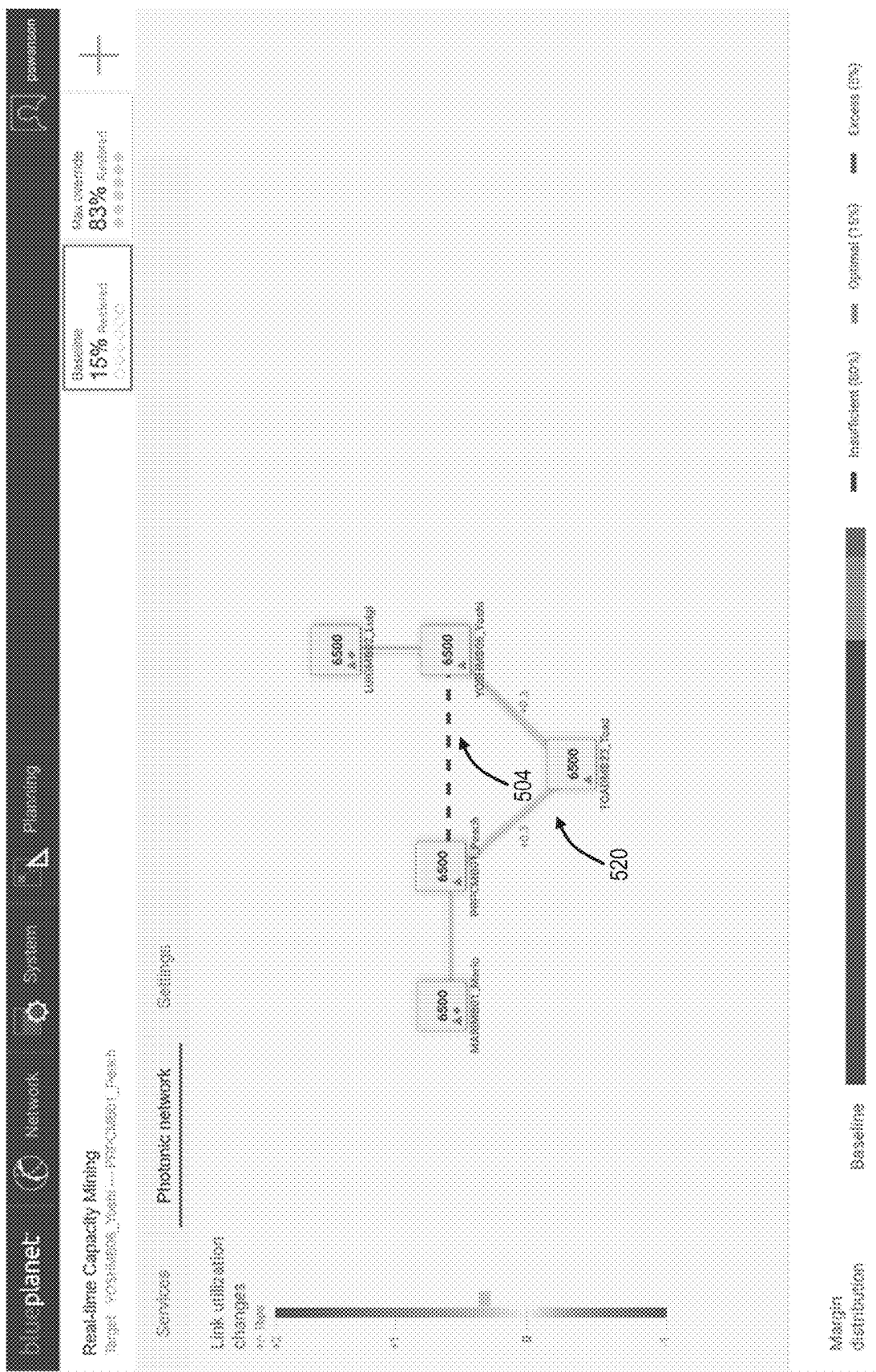

The planning engineer can click on the "Photonic network" tab to bring up the screen in FIG. 15 which illustrates the network with margin distribution shown as a result of the failed link 504. Of note, there is an alternate path 520 circumventing the failed link 504 in this example. Of course, actual optical networks 100 are typically in some form of an interconnected mesh where each node can reach other nodes through alternate paths. Those skilled in the art will recognize these systems and methods described herein can be used in any topology.

Figure 16:
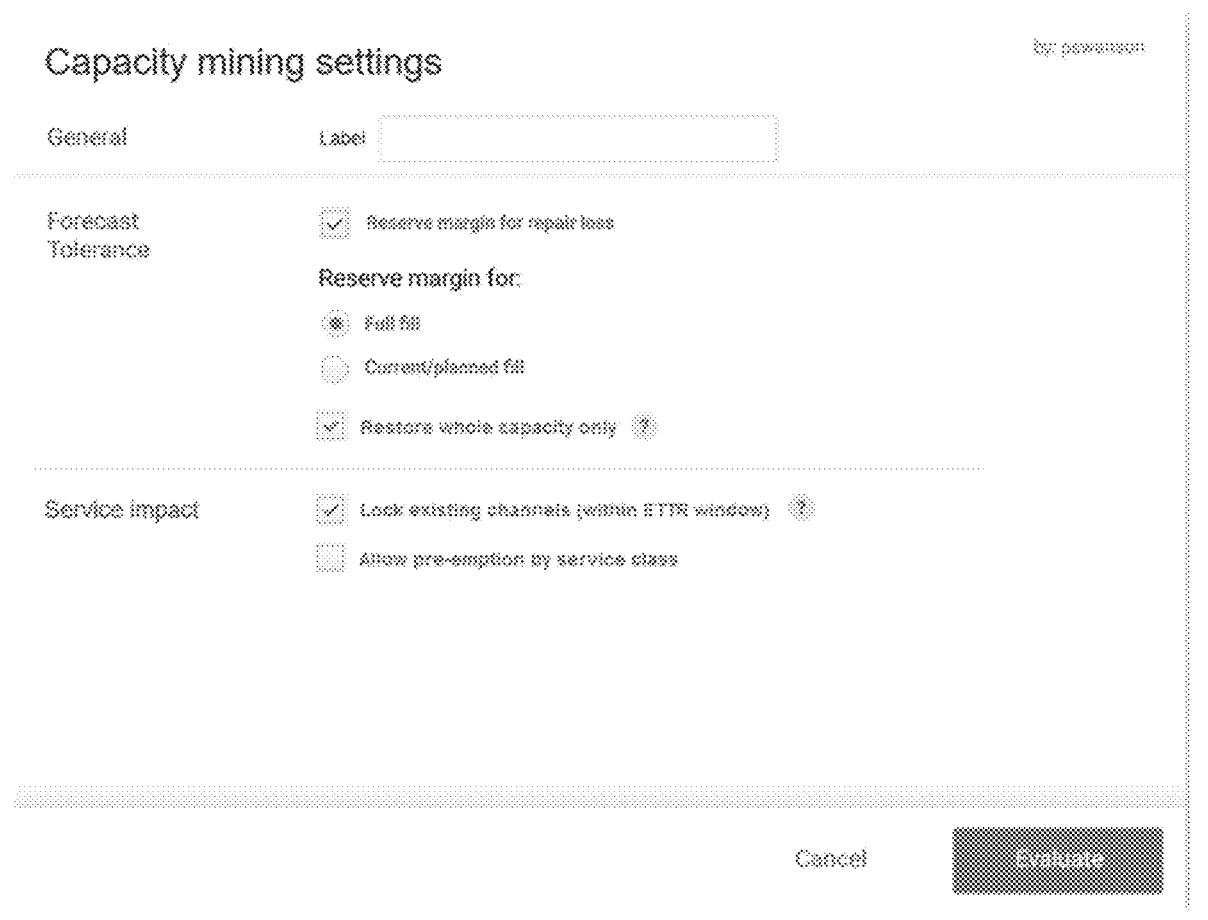

At this point, the planning engineer can create a "Plan B" by clicking on the "+" symbol on the top right to bring up a capacity mining setting screen (FIG. 16). The planning engineer can enter a label under General, e.g., "Plan B," and perform an evaluation in the context of the failed Yoshi-Peach link 504. This evaluation is the capacity mining process to see how many of the 609 services can be restored given what assumptions the planning engineer is willing to loosen.

The planning engineer can release various constraints to recover more capacity (with more risk). For example, the planning engineer can release the easiest constraints first given the situation. This can allow recovery of traffic by temporarily borrowing the margin that was previously reserved for EOL and full fill. That is, the easiest constraint to release is excess margin reserved for EOL and full fill, both conditions which are not current. This is accomplished by the planning engineer unchecking "Full fill" and checking "Current/planned fill." After checking "Current/planned fill," the planning engineer can enter an Estimated Time to Repair (ETTR) amount for how long the margin will be borrowed, e.g., 36 hours (FIG. 17).

Importantly, no changes are made yet to the underlying network. This is merely a "what if" analysis at this point. In FIG. 17, the planning engineer selects "Evaluate," and a new plan is evaluated by the software-defined planning system 300.

Figure 18:

After the evaluation, the results of "Plan B" are shown in FIG. 18. Note, in the top right, the baseline (no capacity mining) recovers 15% (106 services recovered and 609 services down) and this "Plan B" recovers 46%. This is an improvement but did not get all of the capacity recovered. Note, the impacted services count (left-side below info-bar) now states 106 Up, 222 Restorable, and only 387 down— this means if Plan B is executed, the planning engineer will be able to restore an additional 222 services from the Baseline settings. Of course, this Plan B is rather conservative, but that may be desired. Thus, by simply consuming excess margin for EOL and full-fill, an additional 222 services can be restored.

Figure 19:
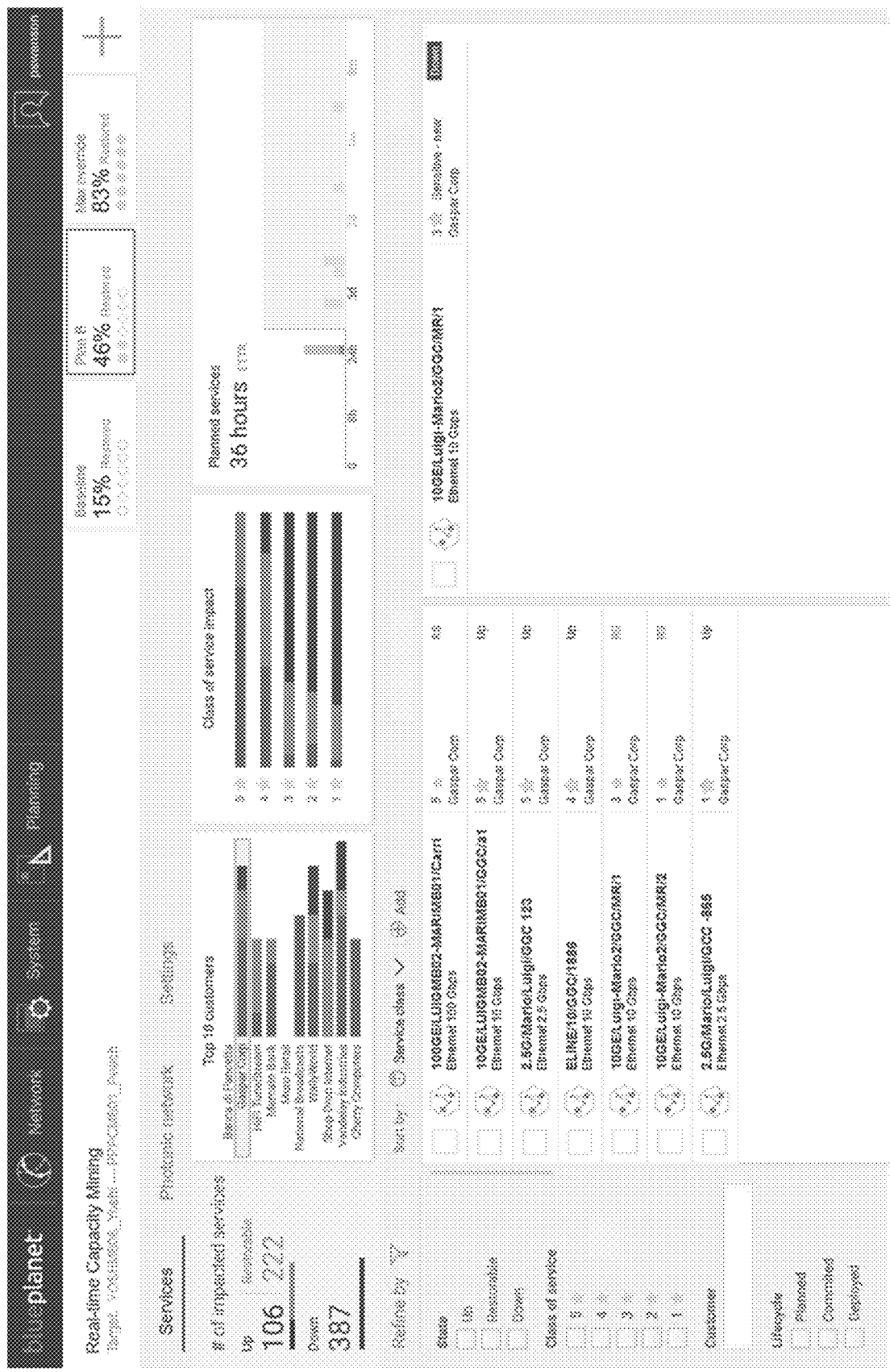
Figure 20:
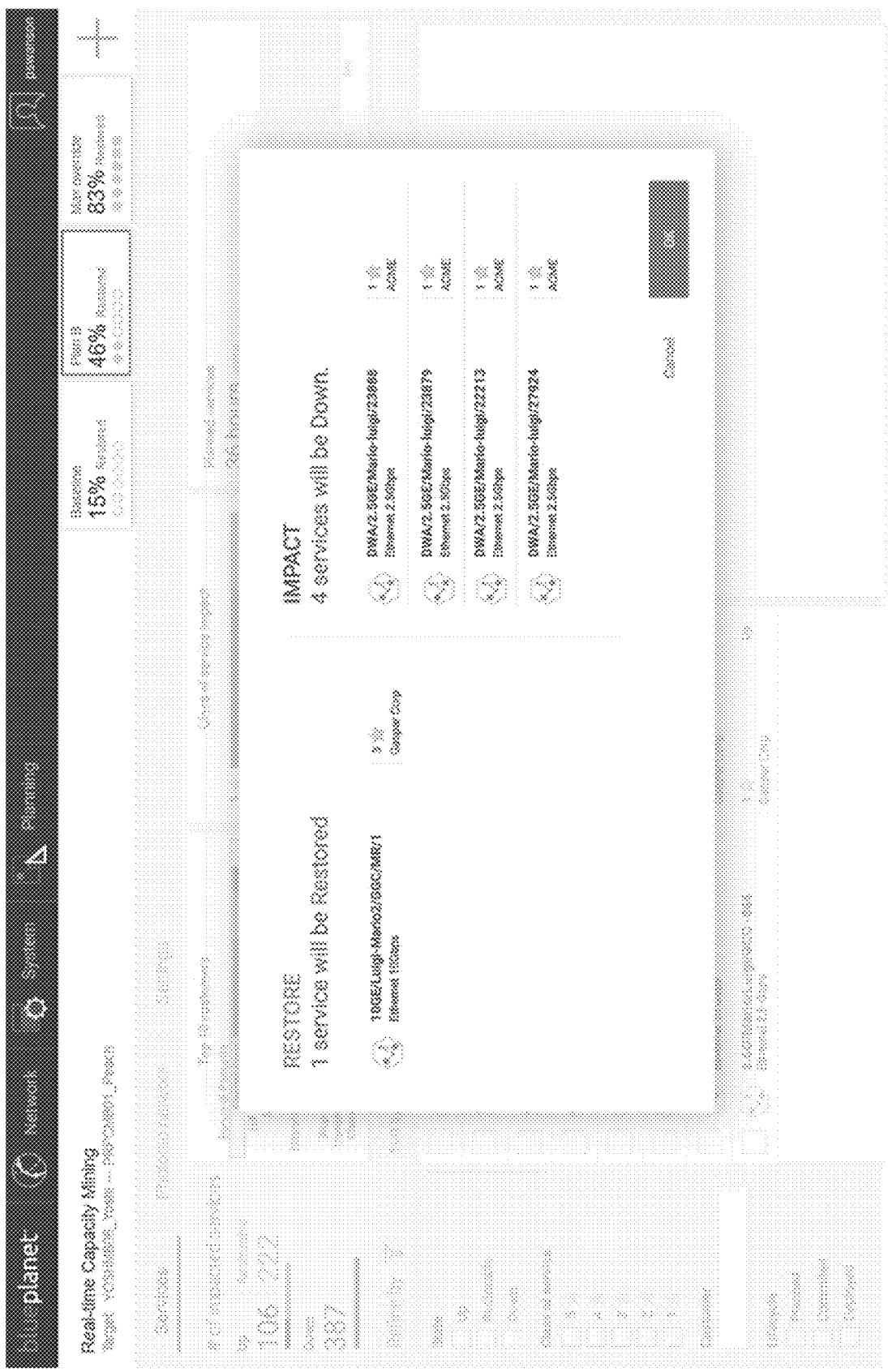

From FIG. 18, the planning engineer can click on the "Top 10 customers" chart to check on Gaspar Corp. to list their services in the context of "Plan B." This is shown in FIG. 19 and note there is still one service down.

The planning engineer can perform a trade-off to recover the last remaining Gaspar Corp. service. In FIG. 19, the planning engineer can drag the last remaining Gaspar Corp. service in the left-hand column over to the right-hand column, and a trade-off dialog appears (FIG. 20) which allows other services to be bumped to save the last remaining Gaspar Corp. service with the accepted capacity mining services. The planning engineer can select "Ok" to accept this trade-off. Again, the underlying computations are performed offline in the software-defined planning system 300.

Figure 21:
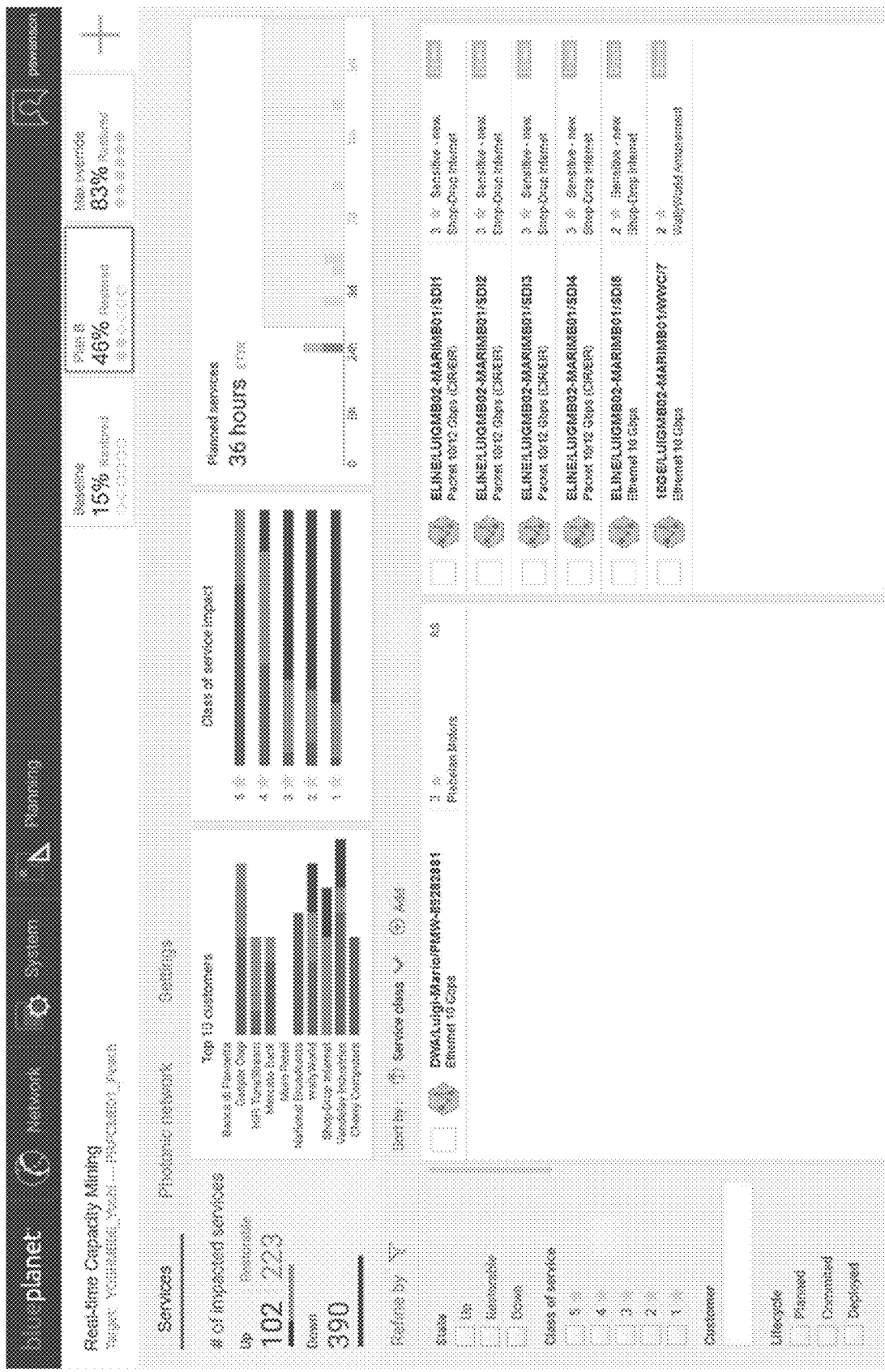

The planning engineer can now select the "Planned services" graph (FIG. 21) which shows some Shop Drop Internet services unavailable. FIG. 21 shows a list display of which planned services scheduled in the next 24 hours will turn up with the new capacity mining services and which will not. Note, Shop-Drop internet planned services will not turn up with current settings, but assume they are an important new account, perhaps squeezing more margin out using the capacity mining setting, the planning engineer could save them too and not jeopardize the account.

Figure 22:
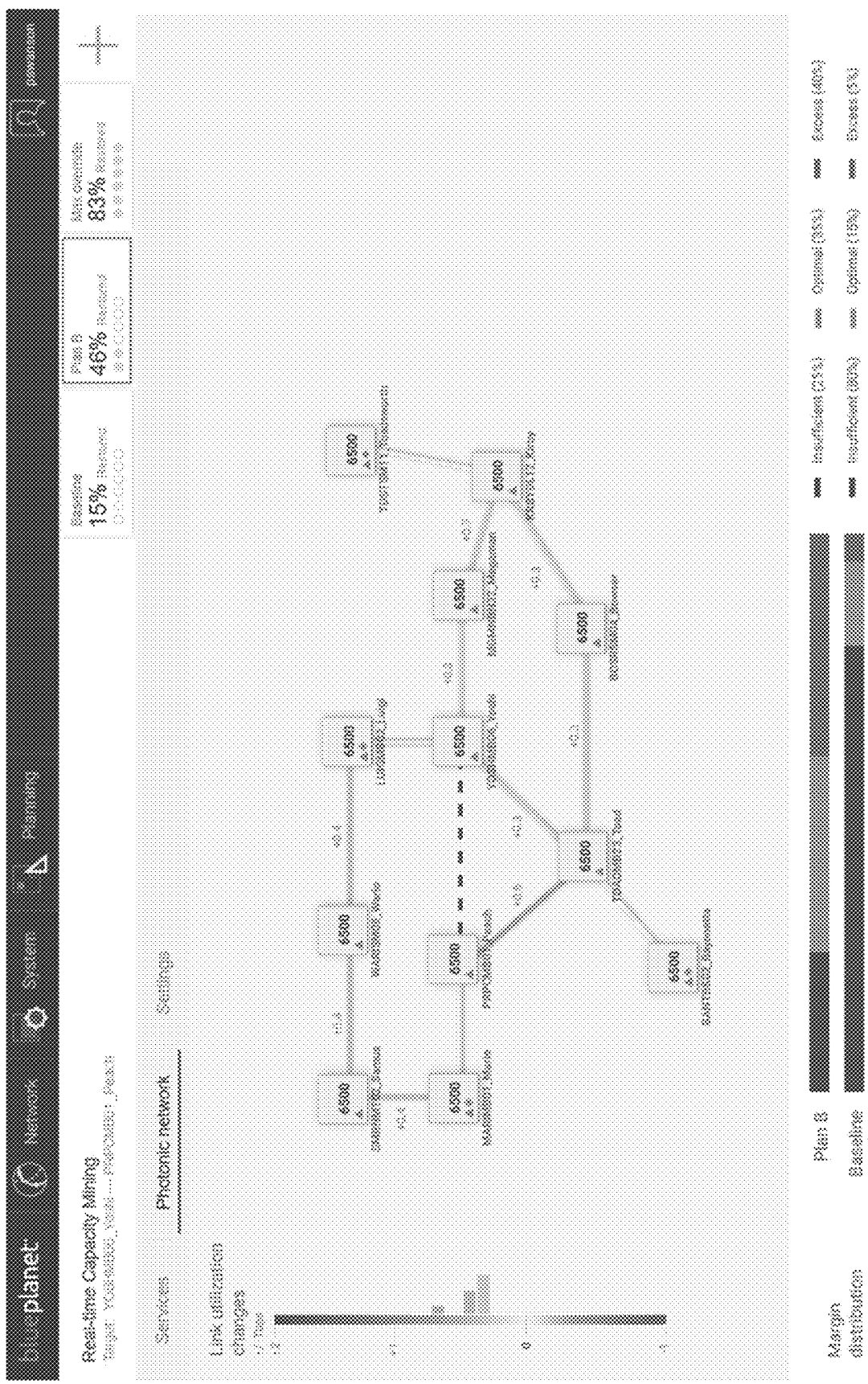

The planning engineer again selects the "Photonic network" tab (FIG. 22) which shows how the photonic network has changed using the capacity mining to reroute traffic that was faulted due to the loss of the Yoshi-Peach link 504. FIG. 22 shows the increased scope of the network with additional links that can be used to recover by borrowing the reserved margin, shows deltas on utilization where restorable traffic could flow, margin distribution on photonic services that have a possible path in the network, etc.

In the baseline, most of the services lacked sufficient margin to come up, even though they had a possible route. In "plan B," most services are restorable by dipping into the reserved margin that the planning engineer has freed up. Note, still some services have insufficient margin, and 40% are actually using more margin than they need. The planning engineer can now see how to apply additional levers to apply that excess margin towards the services with insufficient margin. In effect: "rob from the rich and give to the poor."

Figure 23:
Figure 24:
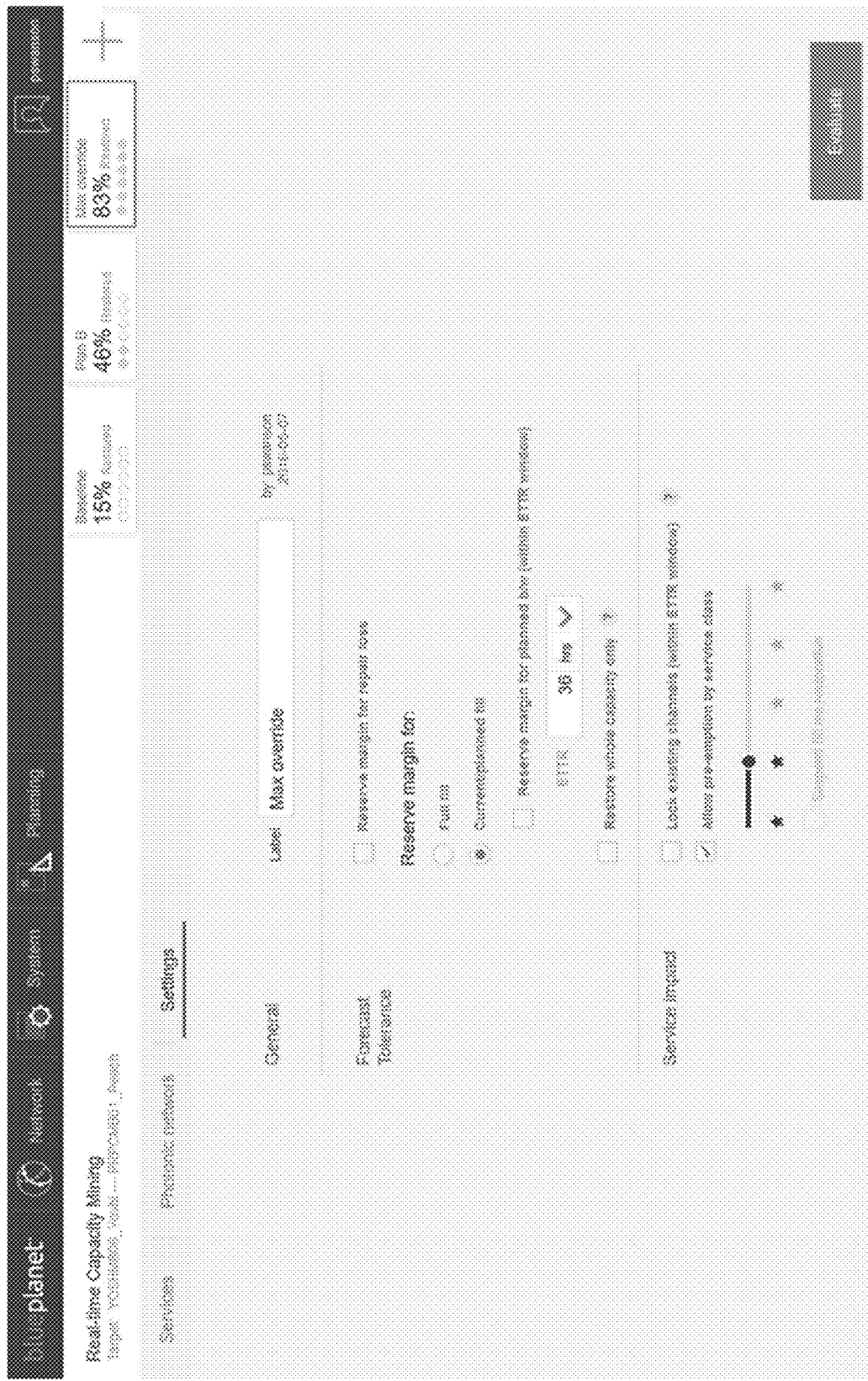
Figure 25:
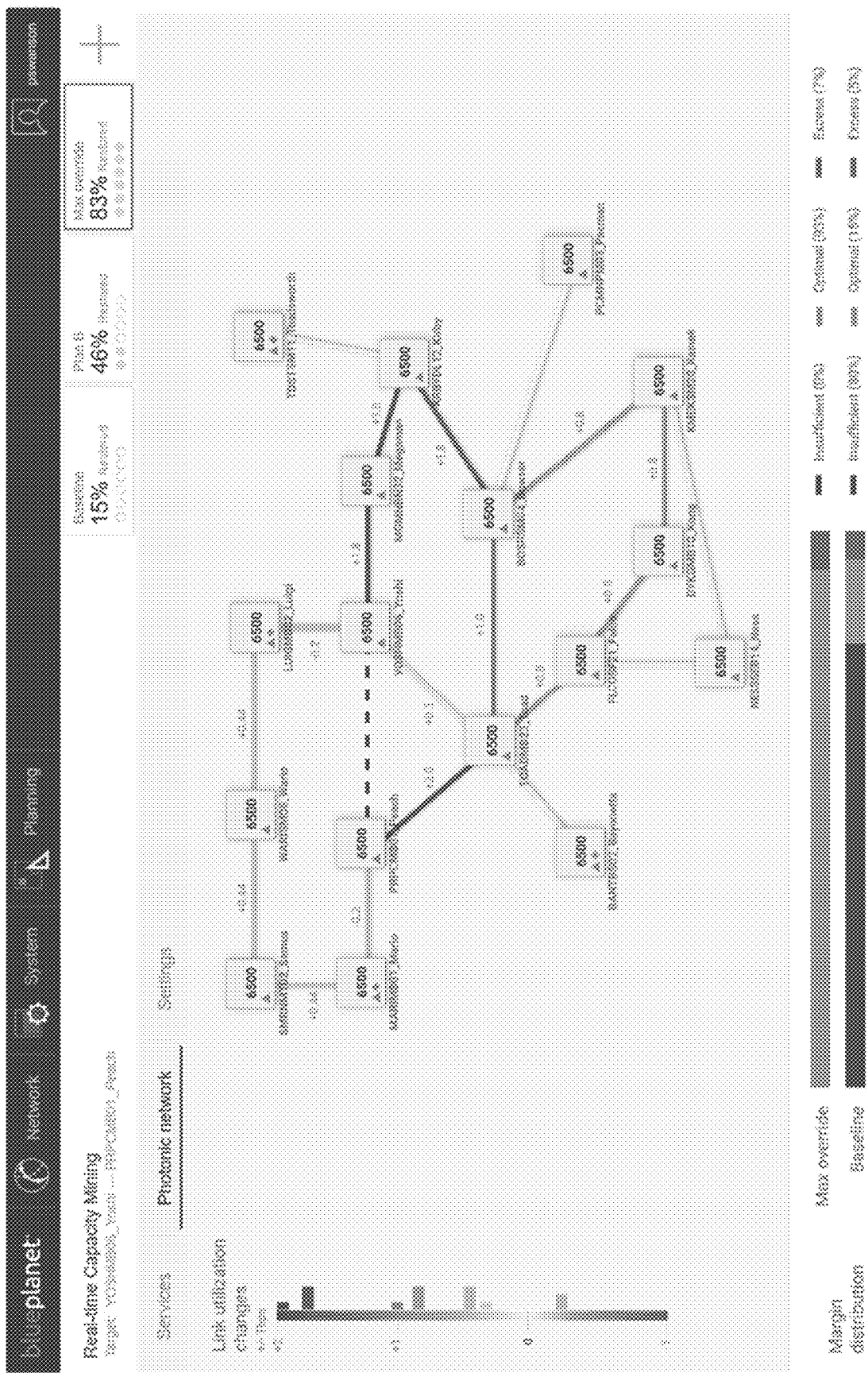

Here, the planning engineer can select the "Max Override" on the top right for a prebuilt plan to see how much could be recovered if the capacity mining was fully utilized to consume as much margin as possible. FIG. 23 shows the "Max Override" screen and FIG. 24 shows the settings for "Max Override." FIG. 25 illustrates the "Photonic network" tab showing the network with the "Max Override"—even more of the network is involved in the restoration. Because there is more reclaimed margin, the network is able to route further in order to recover the services (see southern path). The planning engineer can click on the link to view further details, including the spectral utilization. The planning engineer can check the "Services" tab which shows all concerned photonic services are restorable (Gaspar and Shop Drop Internet).

At this point, the planning engineer can select either the "Plan B" or the "Max Override" for implementation in the network after reviewing the margin, risks, etc. The planning engineer was able to create and compare several what-if scenarios quickly to visualize and understand how each affects the network and services, and even make direct trade-offs. The planning engineer could share these what-if scenarios with decision makers in her organization to help drive a more informed decision.

This approach will help network operators leverage capacity mining to make more effective and informed decisions.

Scheduling Intermittent Services

In another embodiment, the software-defined planning system 300 can be an orchestrator used for accessing orchestrated services and scheduling intermittent/occasional capacity increases thereon as well as using capacity mining. Here, the software-defined planning system 300 can provide a unified view of a multi-layer service and create orchestration profiles which are used to effectuate all necessary changes to the network to accommodate the intermittent/occasional capacity increases.

Of note, short-term demands can be added with higher capacity than longer-term demands. Normal planning for long-term capacity in the network 100 involves including margin for changes in the network 100 which happen over the entire life of the network 100. This includes reserving margin for the end of life (EOL) aging of components, repair margin for multiple fiber cuts on the links 120, a full complement of channels (full spectral occupancy, i.e., full-fill) on the links 120 imparting more non-linear noise on all channels, etc. When planning is performed for short-term demands, some or all of these additional margin components can be ignored or relaxed using the software-defined planning system 300. Especially in the case of non-full fill, a scheduling system in the SDN controller 160 is aware of the changes planned in the network 100. The confidence in these plans, and the resulting partial spectral occupancy which results is greater for the short term than for the long term. Therefore, the amount of margin that needs to be assigned for spectral fill can be better anticipated for short-term demands and therefore the system can use this knowledge to increase the capacity delivered in this time frame accordingly.

For accessing orchestrated services and scheduling intermittent/occasional capacity increases, the systems and methods utilize profiles which can span multiple layers (L0 (photonic), L1 (Time Division Multiplexed (TDM)), L2 (Ethernet, MPLS, etc.), L3 (IP), etc. The profiles include settings across the layers which can be pushed to the underlying networking equipment to cause the changes via control plane 140. Thus, an operator only needs to make high-level selections for scheduling intermittent/occasional capacity increases, and the system orchestrates based on the profiles.

FIGS. 26-39 are UI screens associated with an example of scheduling intermittent/occasional capacity increases. In this example, for illustration purposes, it is assumed that orchestration is used to set up services between virtual vEPC endpoints and Wireless Base Transceiver Stations (BTSs) at major event locations such as large sports stadiums utilizing an underlying photonic network supporting capacity mining. Those skilled in the art will recognize any type of scheduling is contemplated.

Figure 26:
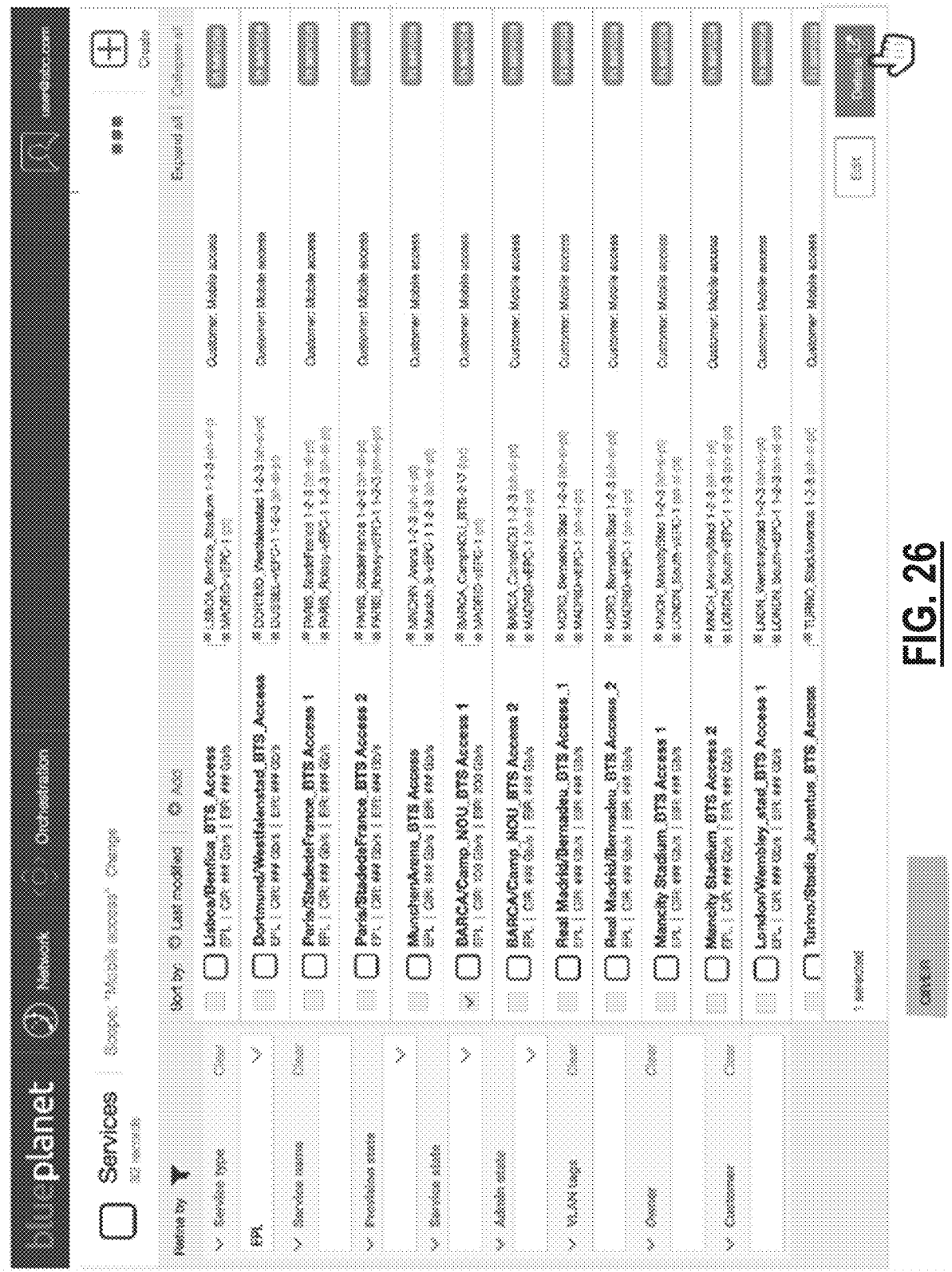
FIGS. 26-39 are UI screens associated with an example of scheduling intermittent/occasional capacity increases.

FIG. 26 is a screen where the workflow begins with a listing of orchestrated services. A specific service can be selected where additional capacity is required, such as to support a major event. In this example, the services are a combination of optical capacity at Layer 0, TDM capacity at Layer 1, and packet capacity at Layer 2. The software-defined planning system 300 is configured to schedule increases at all of the layers for each service.

Figure 27:
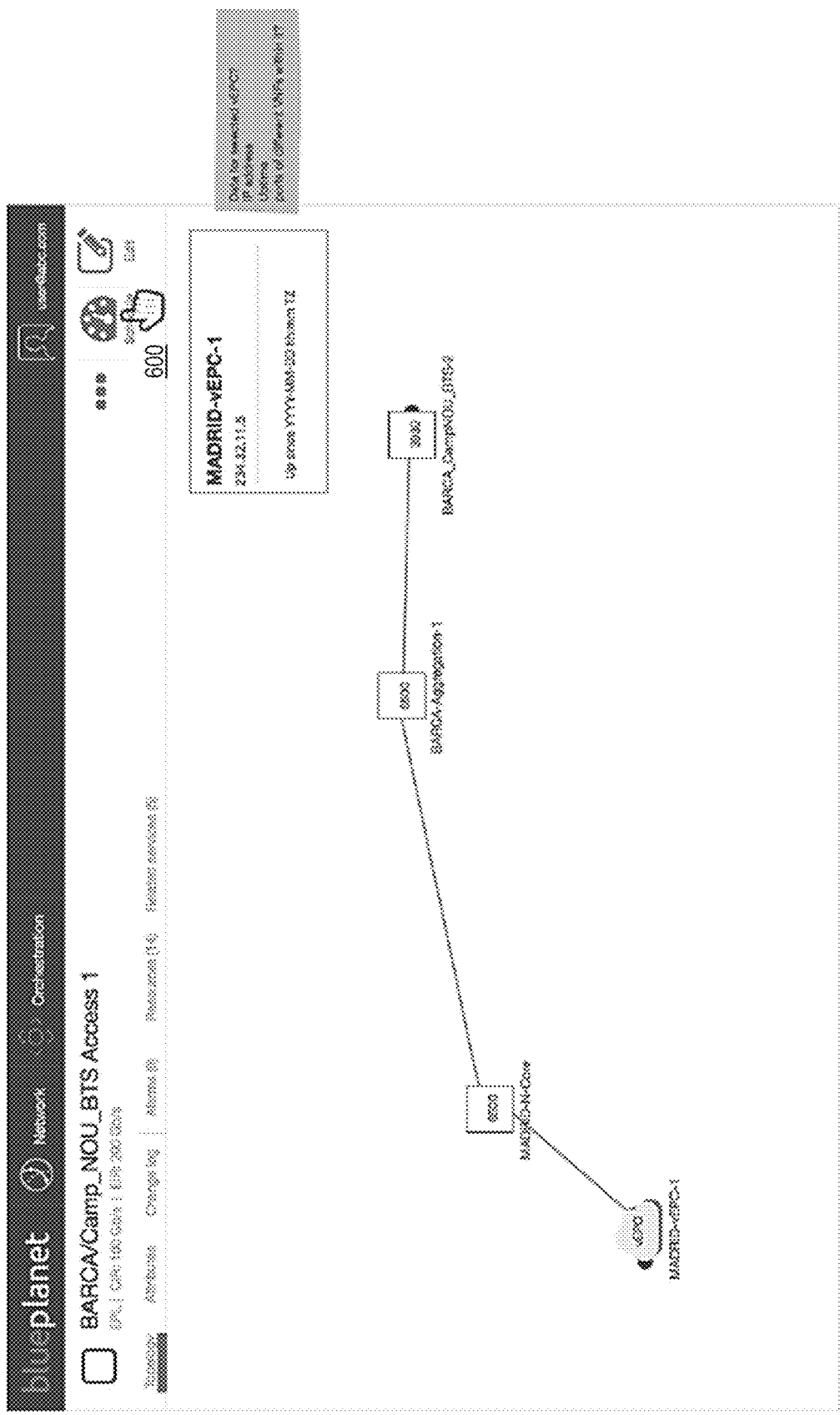

For example, the upcoming UEFA championship game is at Barcelona's Camp NOU stadium, and this service is selected in FIG. 27. Specifically, an operator selects BARCA/Camp_NOU_BTS_Access 1 from the list in FIG. 26 to bring up the UI in FIG. 27 which illustrates the service and the connectivity in the network. In FIG. 27, the operator can click on a schedule button 600 to schedule new capacity for this service.

Figure 28:
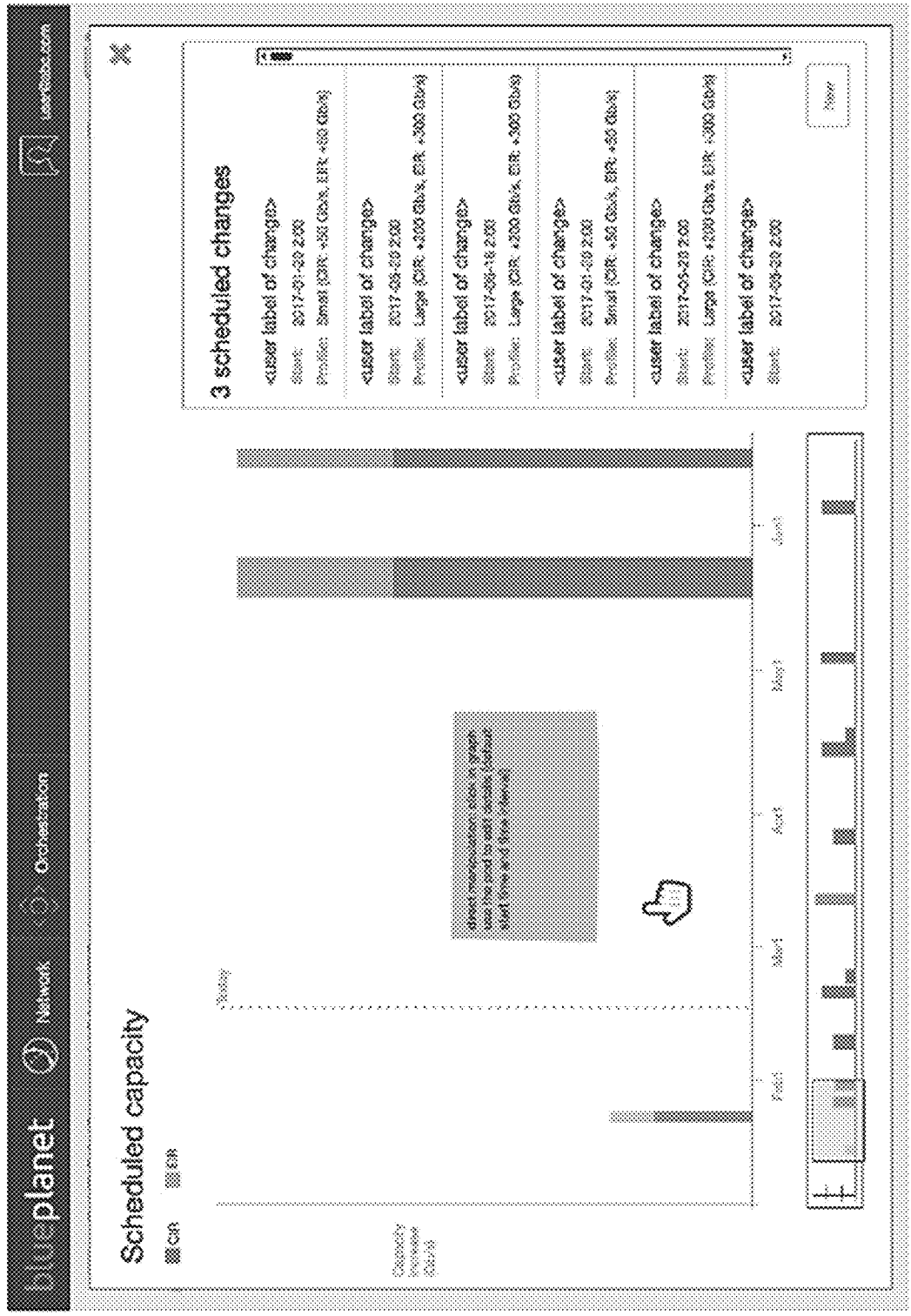

After clicking on the schedule button 600, in FIG. 28, a screen illustrates the set of already-planned planned capacity increases in a timeline graph. An operator can directly manipulate the graph to add a new, scheduled capacity increase including selecting a capacity increase profile and start/end times. The graph illustrates past increases in capacity in different colors showing the configured capacity and the used capacity. The used capacity can be based on average throughput on Ethernet services, based on a number of dropped packets, etc. The graph has the x-axis based on time with a dotted line showing the current day—bars before the dotted line show the previous capacity increases and bars after the graph show planned increases.

Figure 29:
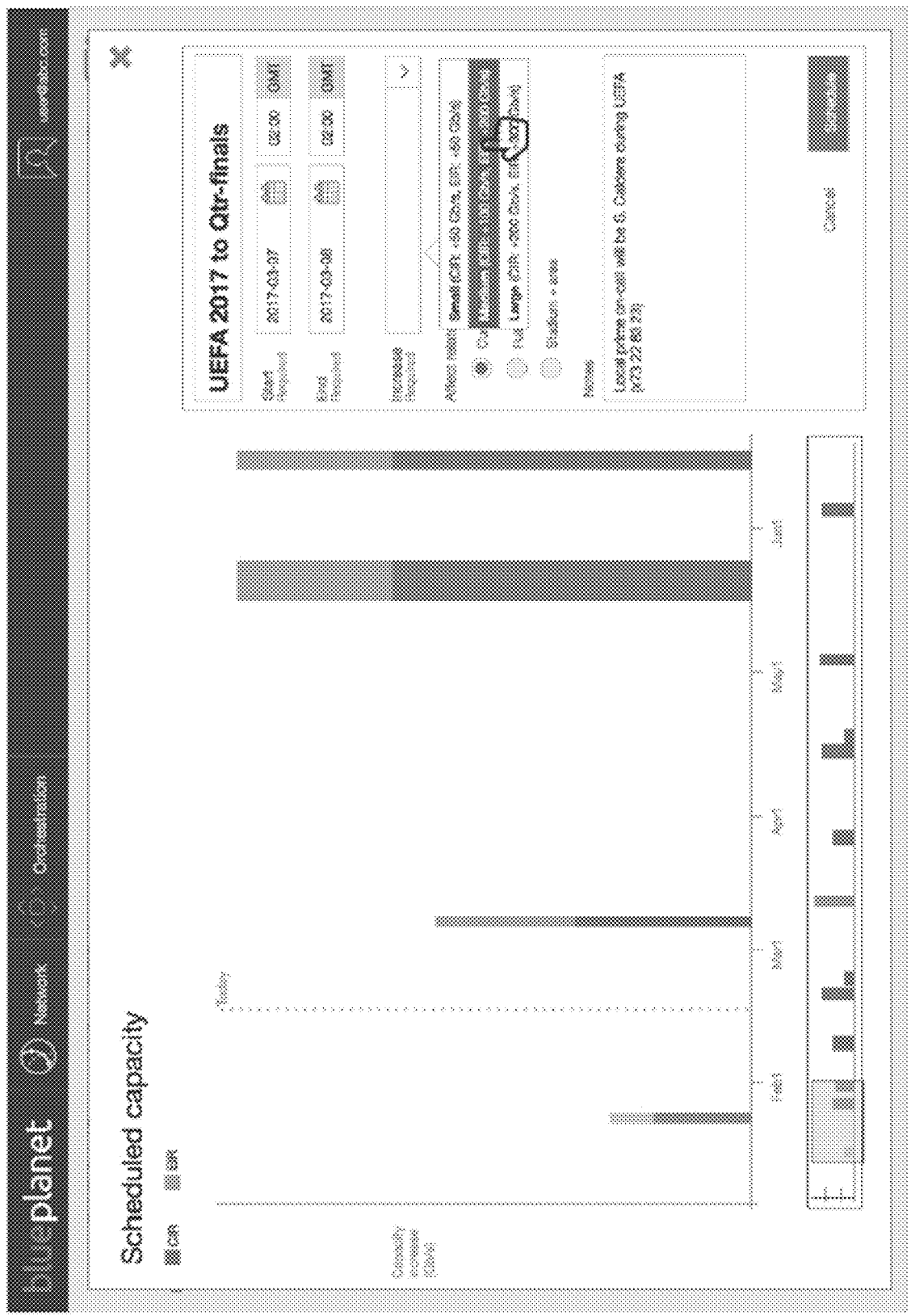
Figure 30:
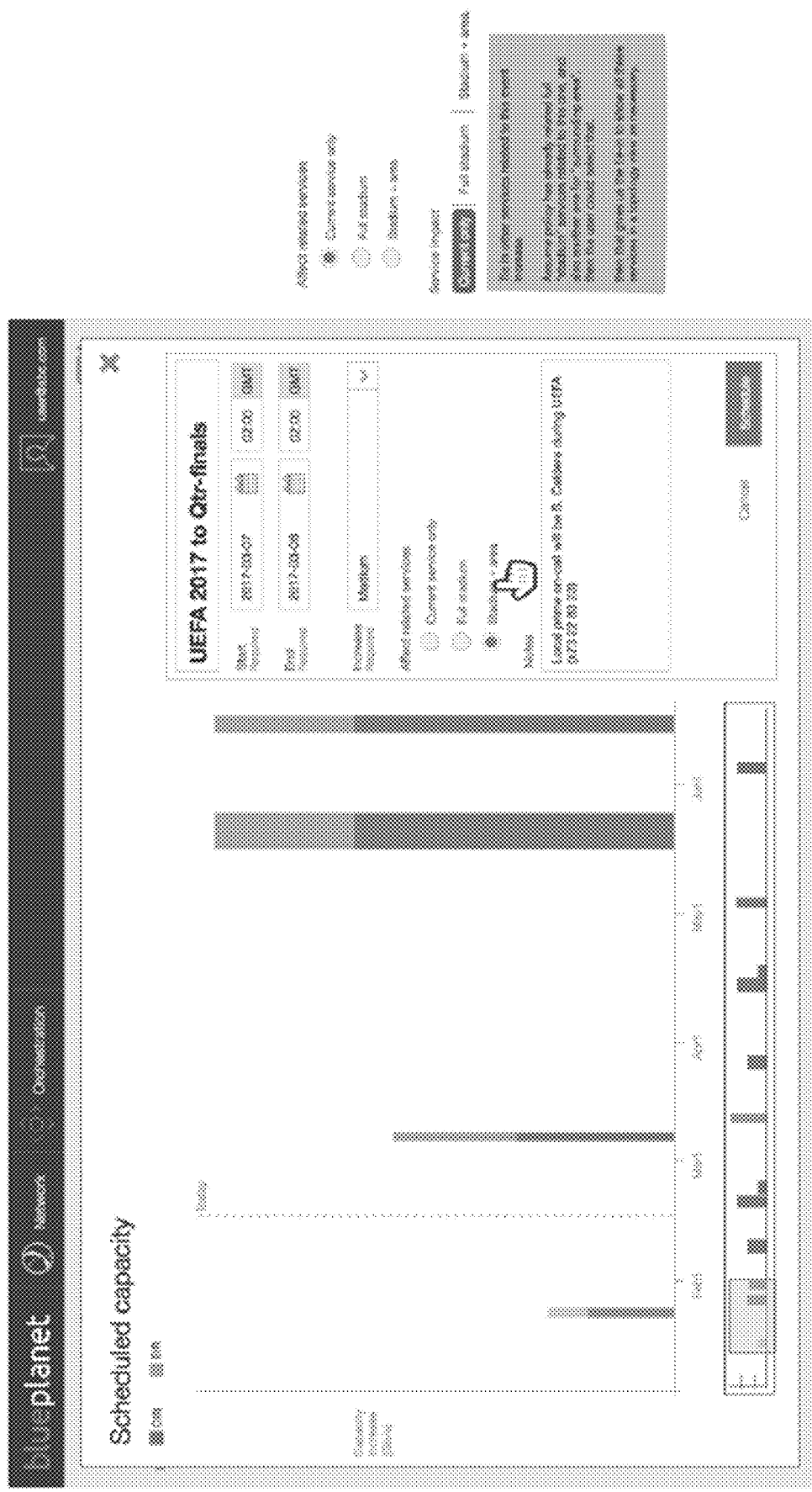

In FIG. 29, a new increase is added. The profile can be based on a pulldown menu and other field data for timing and notes. In FIG. 29, a medium increase profile is selected, e.g., increasing Committed Information Rate (CIR) by 100 Gb/s and Excess Information Rate (EIR) by 200 Gb/s. In an embodiment, the scheduling can change L2 packet bandwidth in terms of CIR and EIR. Also, the scheduling can change L1 bandwidth and/or L0 wavelengths, as well as combinations to support a multi-layer service. In FIG. 30, the operator can select what services to change—current service only, full stadium, stadium+surrounding area, etc.

Figure 31:
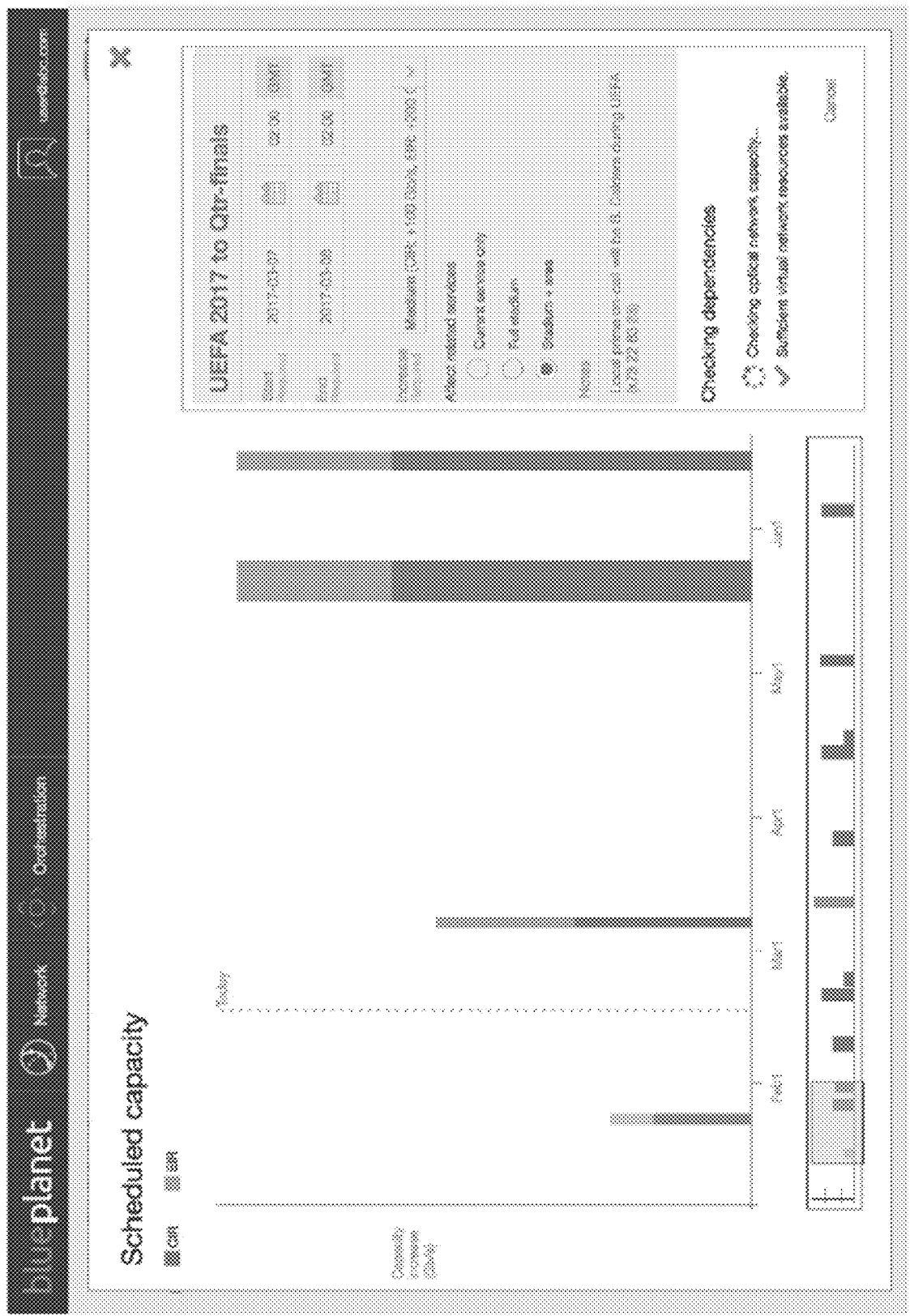

In FIG. 31, the increase is selected—medium +stadium +surrounding area and the software-defined planning system 300 checks dependencies—optical network capacity and virtual network resources. The software-defined planning system 300 will use the selected profile to determine what to change in the underlying infrastructure. Includes orchestration of:

dynamic scaling of vEPC Virtual Network Functions (VNFs) (virtualized Evolved Packet Core VNFs), measuring the effect on Net System Margin (NSM) for supporting wavelengths when leveraging capacity mining (e.g., changing modulation to borrow unused margin temporarily), and increasing bandwidth profile characteristics on the Ethernet service to enable it to consume the additional capacity.

Figure 32:
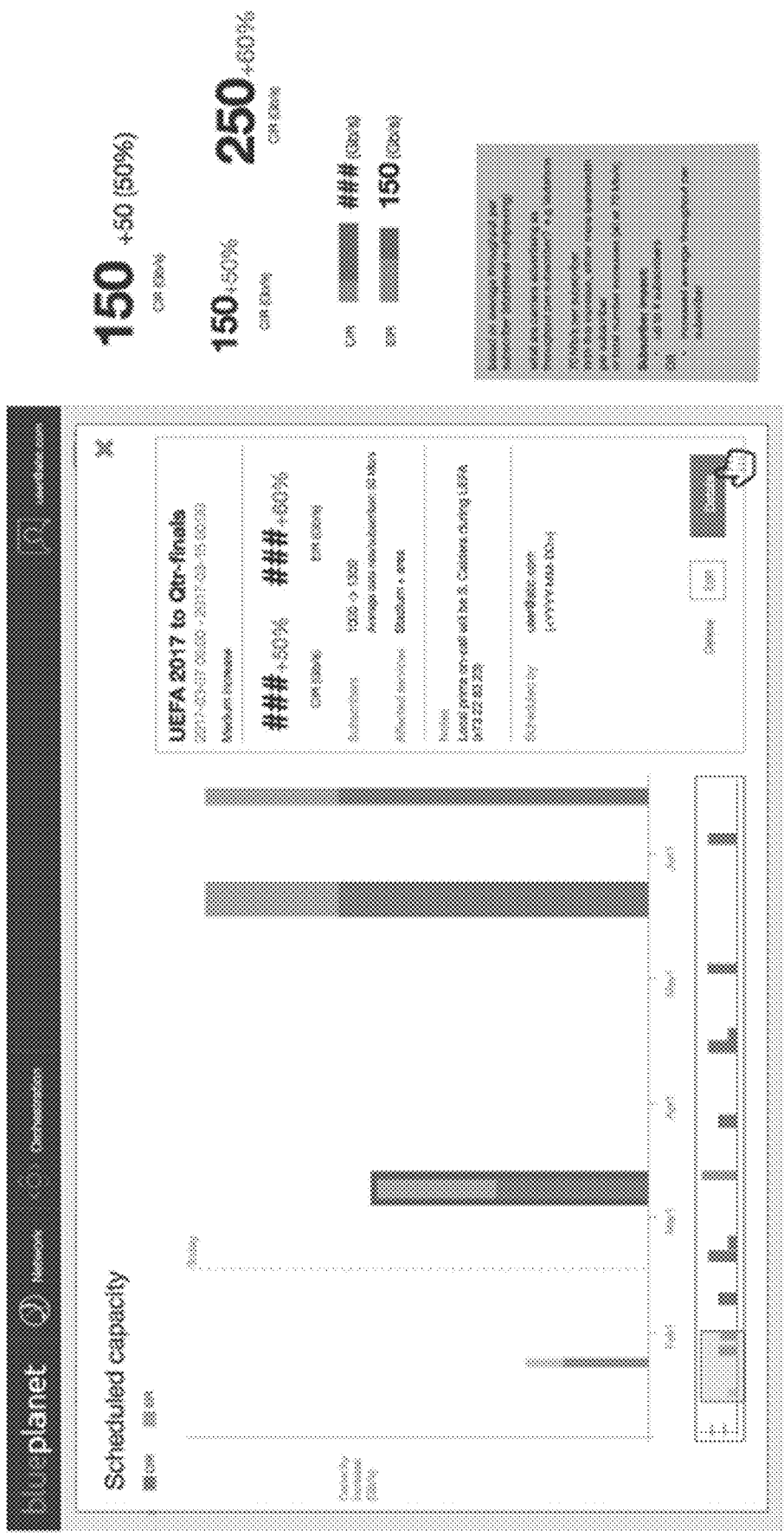
Figure 33:
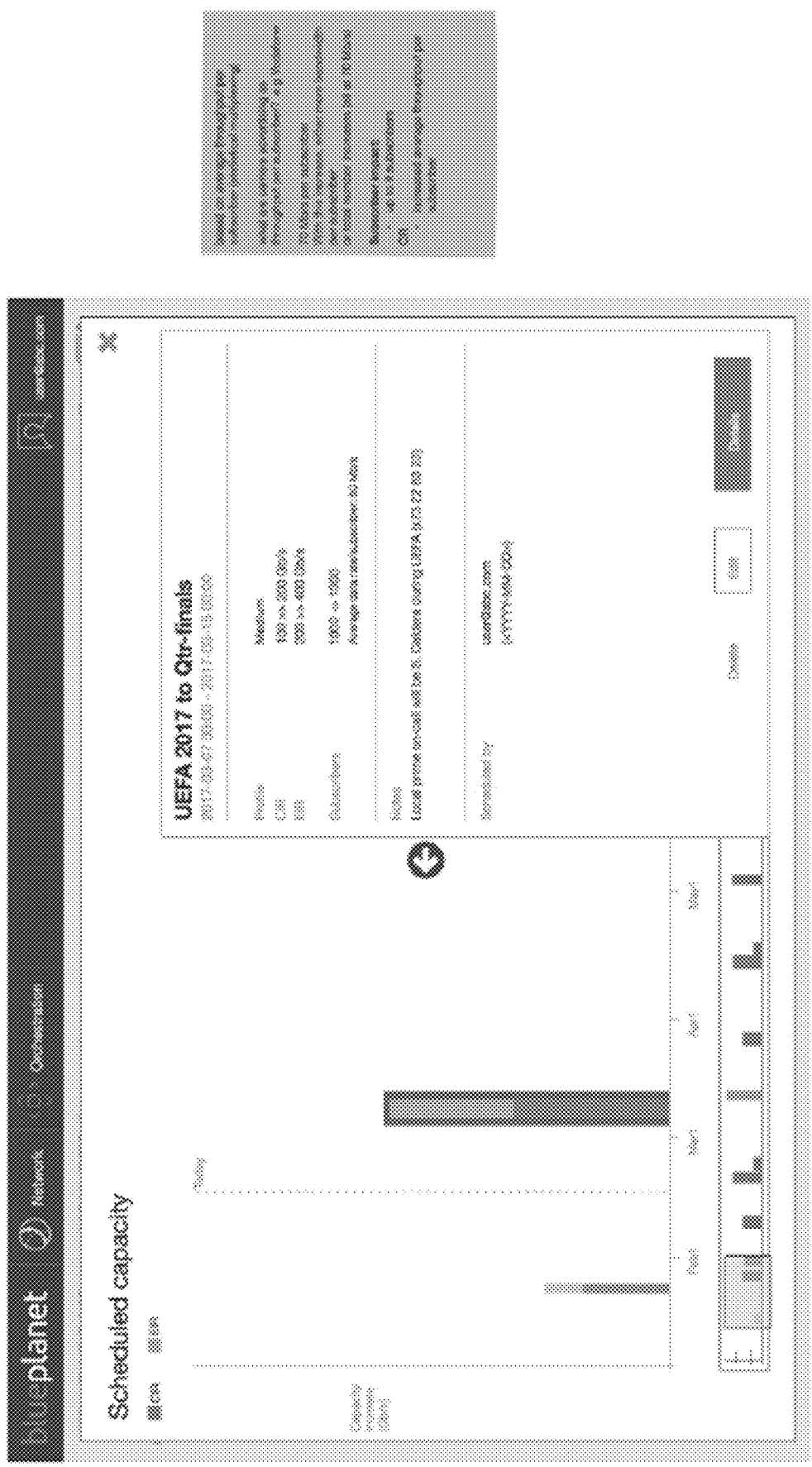

The software-defined planning system 300 can determine if sufficient resources will be available in the network to achieve the increase in capacity during the scheduled period and notify the user. FIGS. 32 and 33 show the scheduled capacity.

Figure 34:
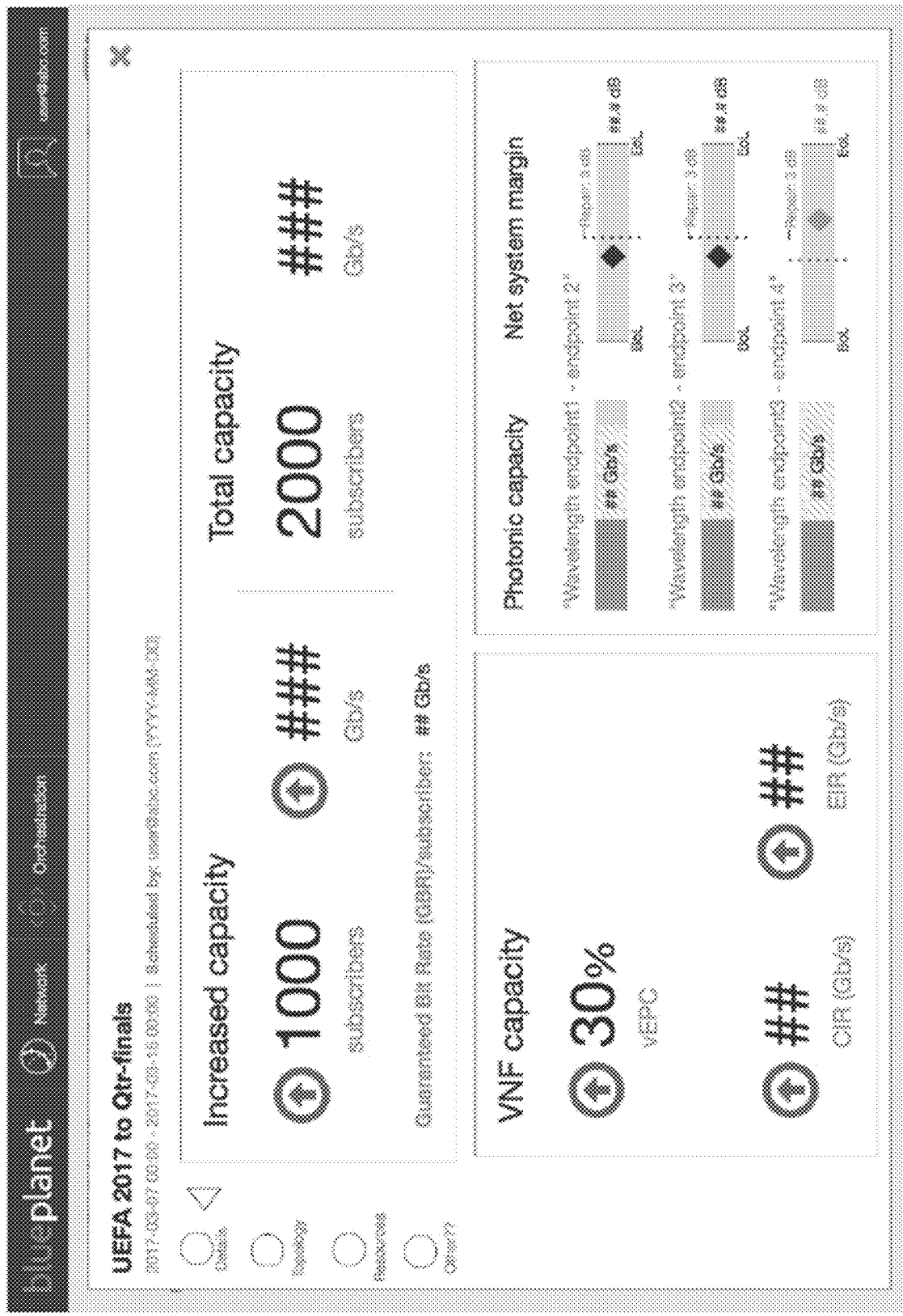

FIG. 34 visualizes the predicted effect on wavelength NSM based on knowledge of current optical network 100 usage and other planned capacity changes happening at the same time. This will help the user in "what if" scenario planning for future capacity increases. One aspect of the software-defined planning system 300 is the awareness, not only of the current real-time status of the optical network and the currently deployed services, but also of the planned and/or scheduled services that are coming on-line in the near future and how they will affect or be affected by any mined capacity changes whether they are for immediate disaster restoration or scheduled to support temporary capacity increases in the future.

Specifically, the software-defined planning system 300 can illustrate:

The expected impact to Pre-Forward Error Correction (FEC) Bit Error Rate (BER) and how it relates to the fiber's planned End of Life (EOL) BER, and Whether the NSM leaves sufficient repair margin to deal with fiber cuts.

Figure 35:
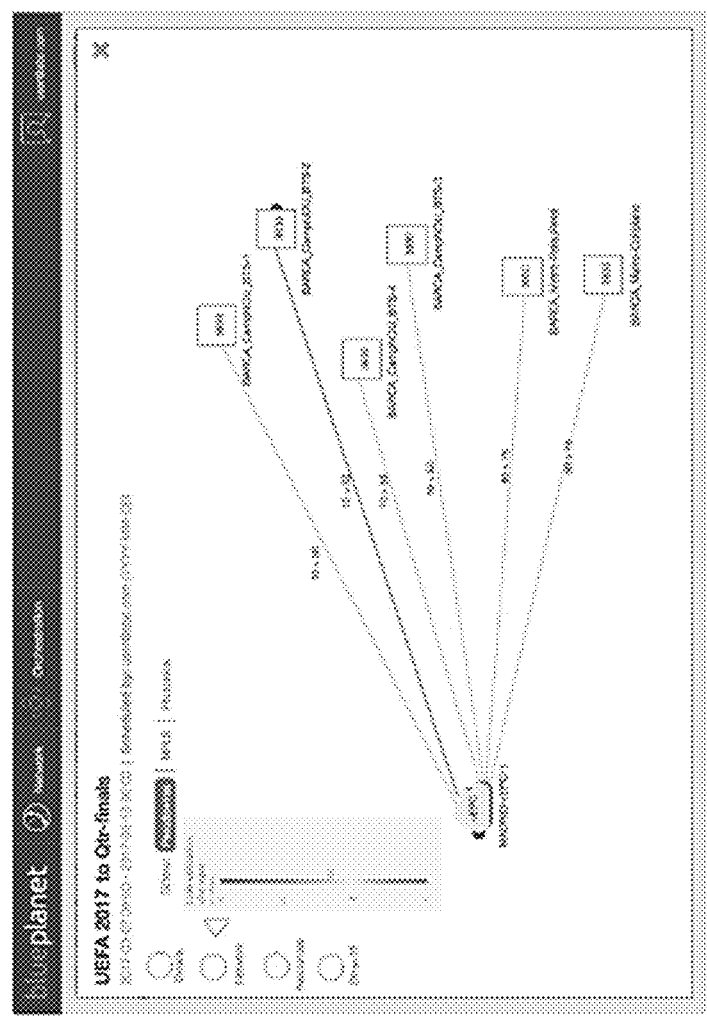
Figure 36:
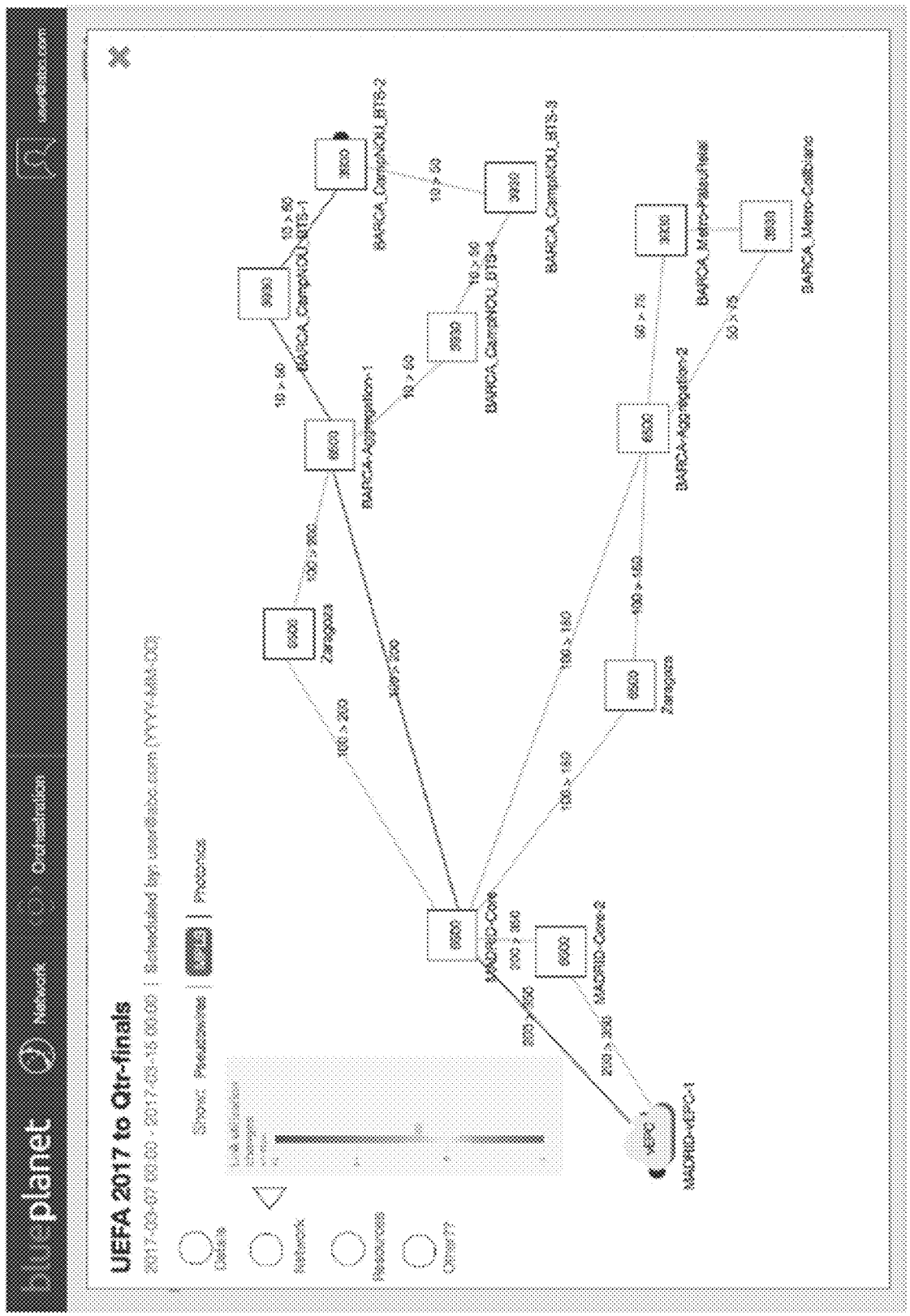
Figure 37:
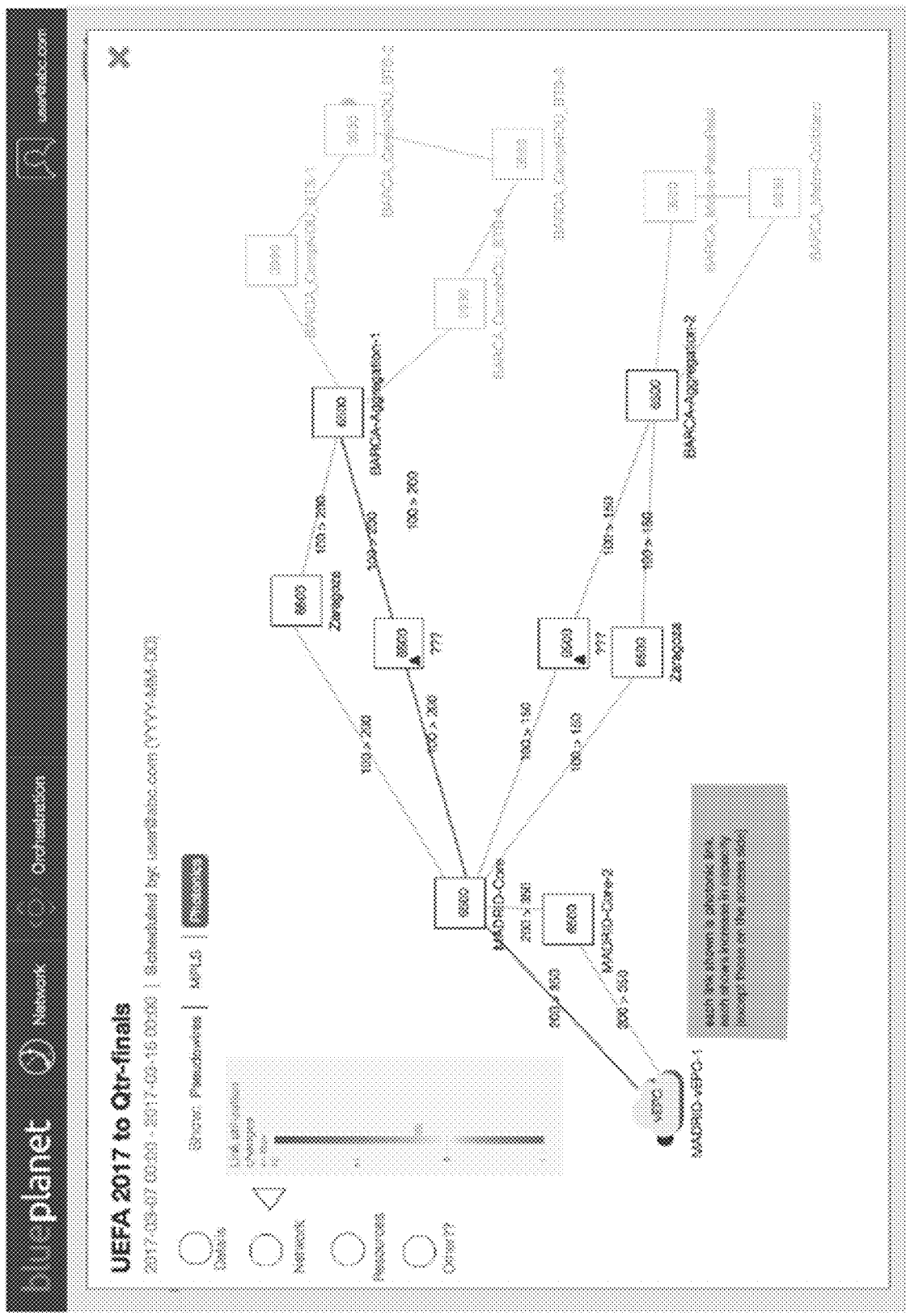
Figure 38:
Figure 39:
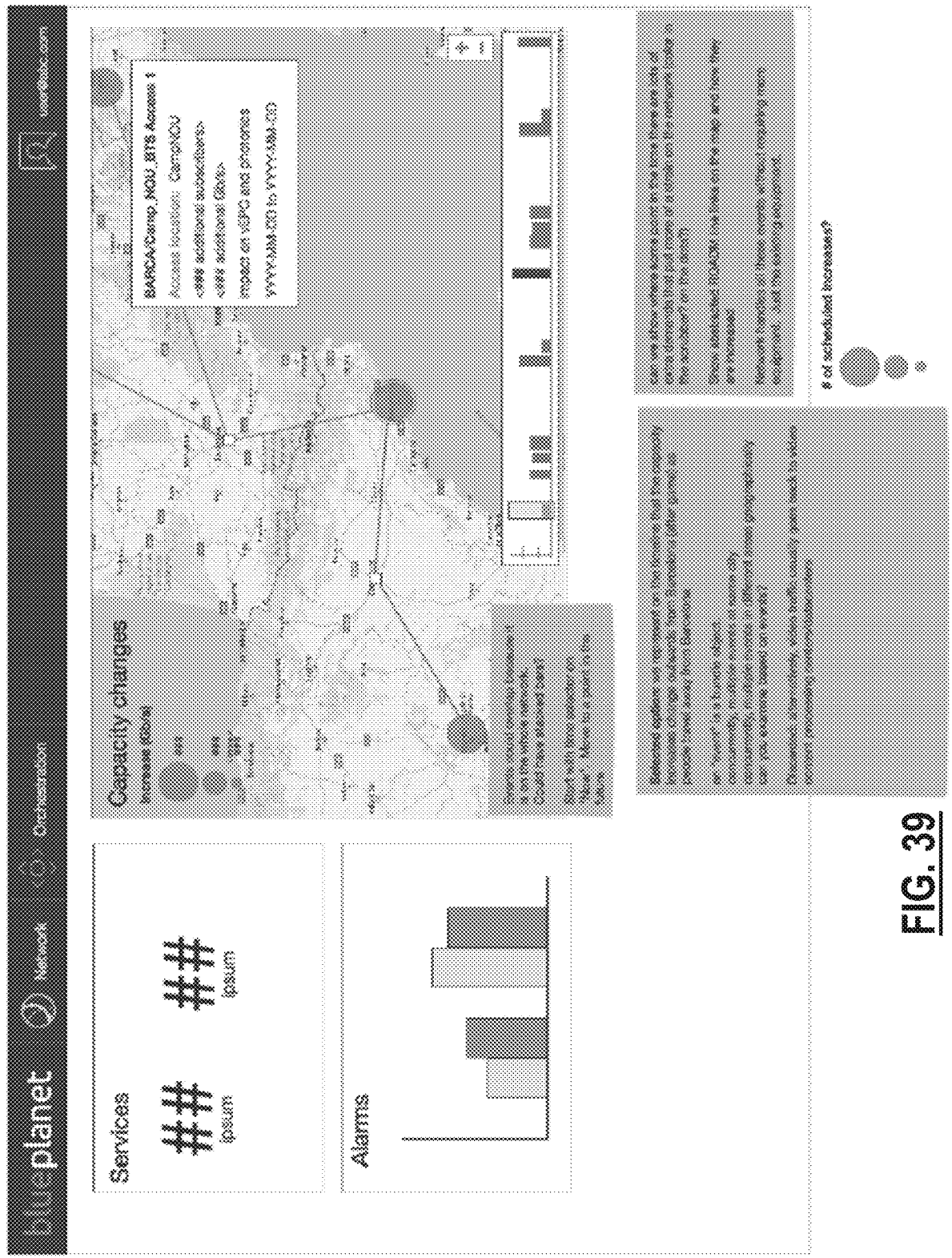

Finally, users will be able to visualize all concurrent network-wide capacity increases on a geographical map by an Access point (scoped by time on a miniaturized timeline) (FIGS. 35-39). FIG. 35 illustrates a network map associated with the service at a pseudowire level. FIG. 36 illustrates a network map associated with the service at an MPLS level. FIG. 37 illustrates a network map associated with the service at a photonic level. FIG. 38 is a list of various network objects associated with the service including 3 wavelengths, 3 VNFs, a Label Switched Path (LSP) tunnel, etc. FIG. 39 is a geographic map along with a timeline graph of service changes.

Figure 40:
FIGS. 40-46 are UI screens associated with another example of scheduling intermittent/occasional capacity increases.
Figure 41:
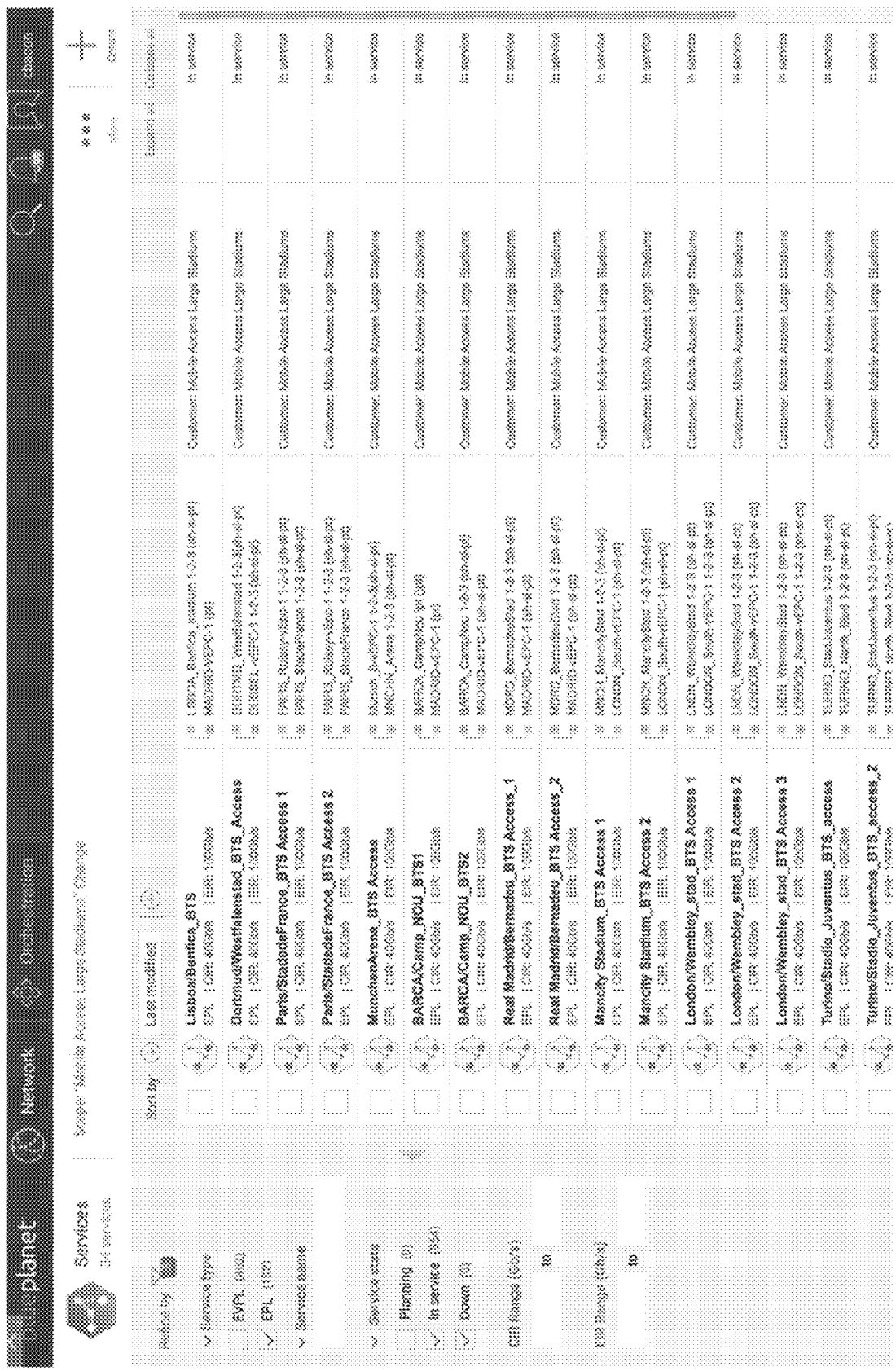
Figure 42:
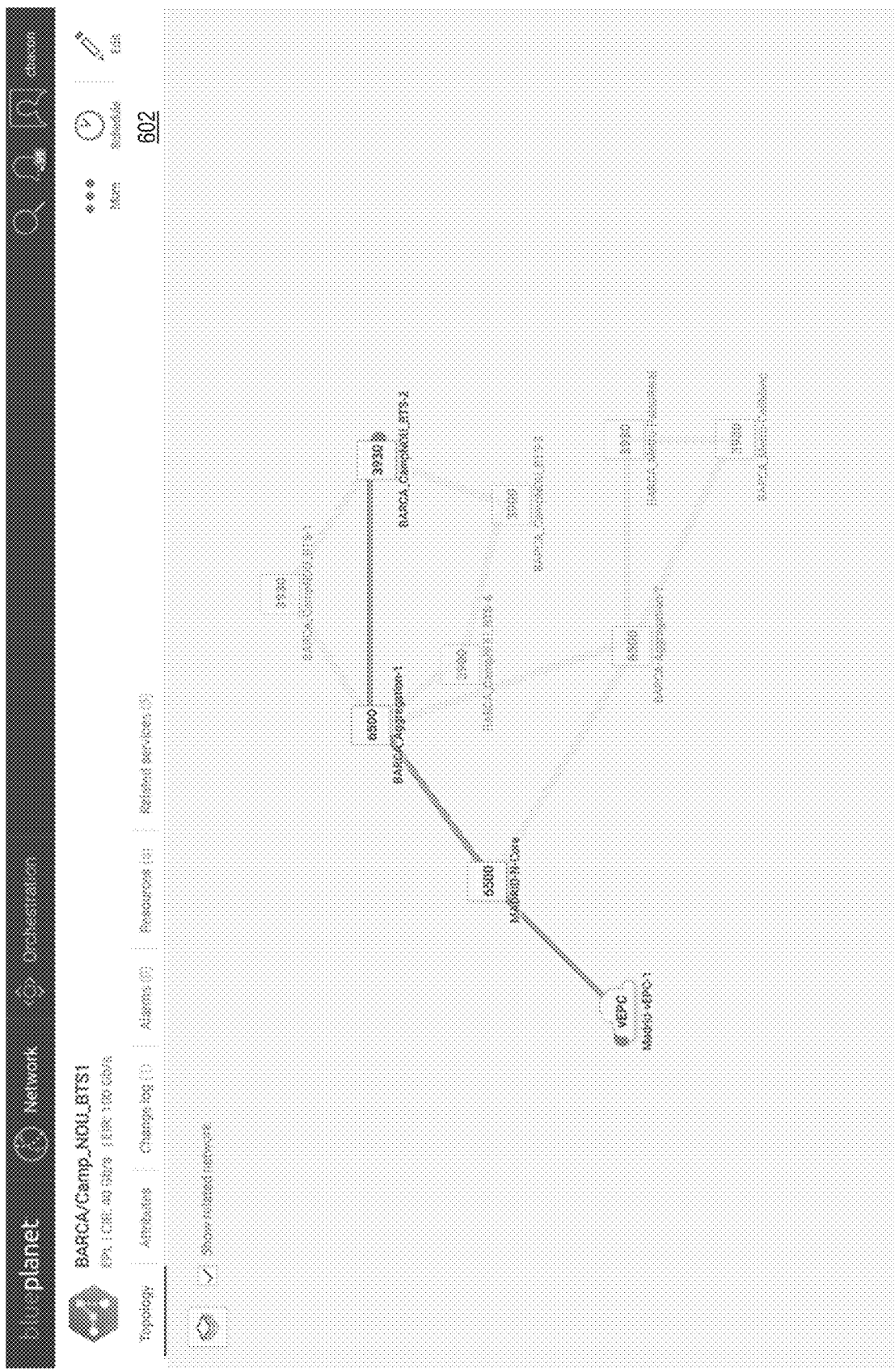
Figure 43:

FIGS. 40-46 are UI screens associated with another example of scheduling intermittent/occasional capacity increases. FIG. 40 is a dashboard with a geographic map, a listing of resources, domains, services, subscribers, and system health. FIG. 41 is a listing of services obtained by selecting the services in FIG. 40. In this example, the service BARC/Camp_NOU_BTS1 is selected as shown in FIG. 42. After selecting the schedule button 602, a timeline is presented as illustrated in FIG. 43.

Figure 44:
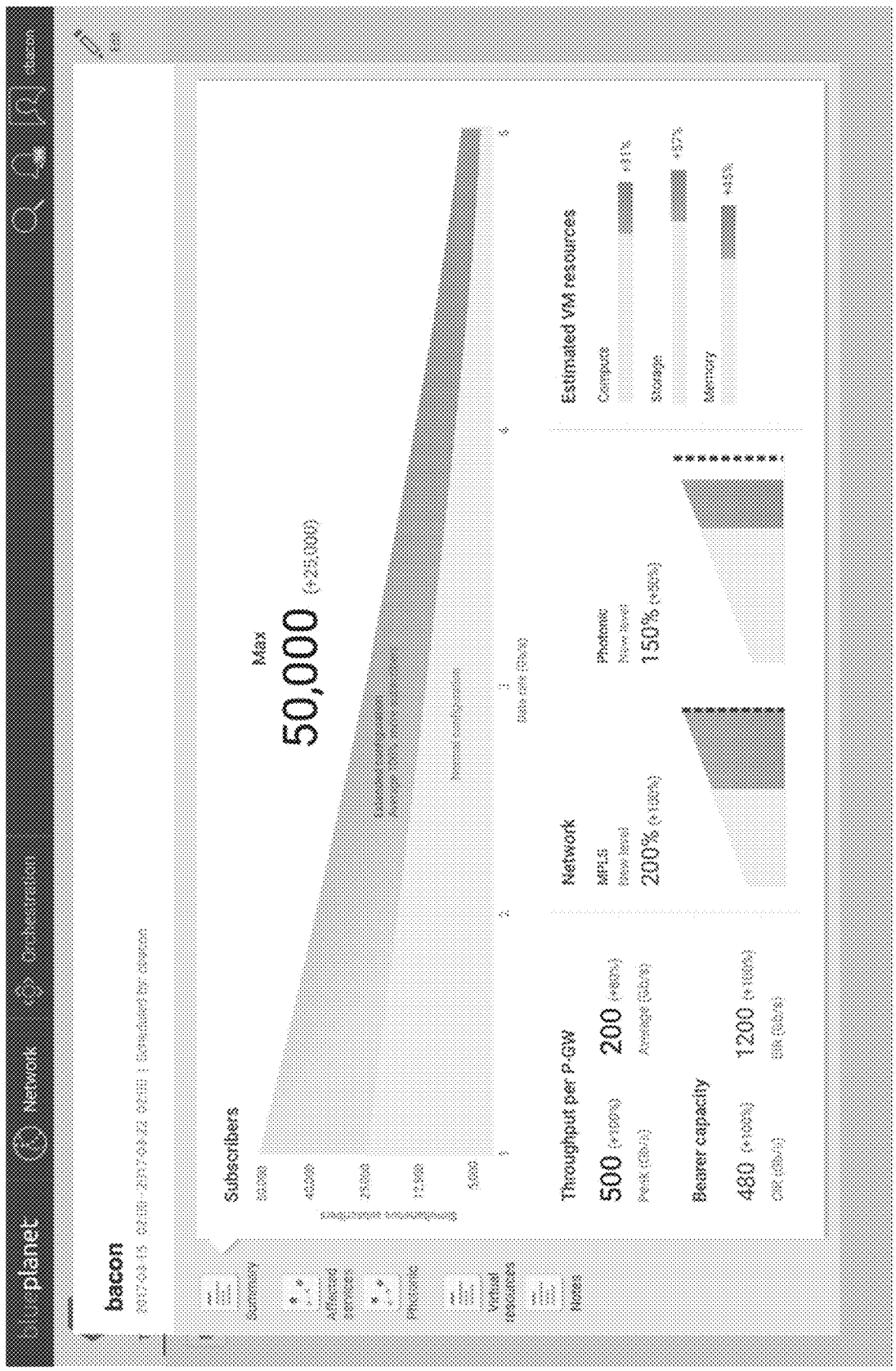
Figure 45:
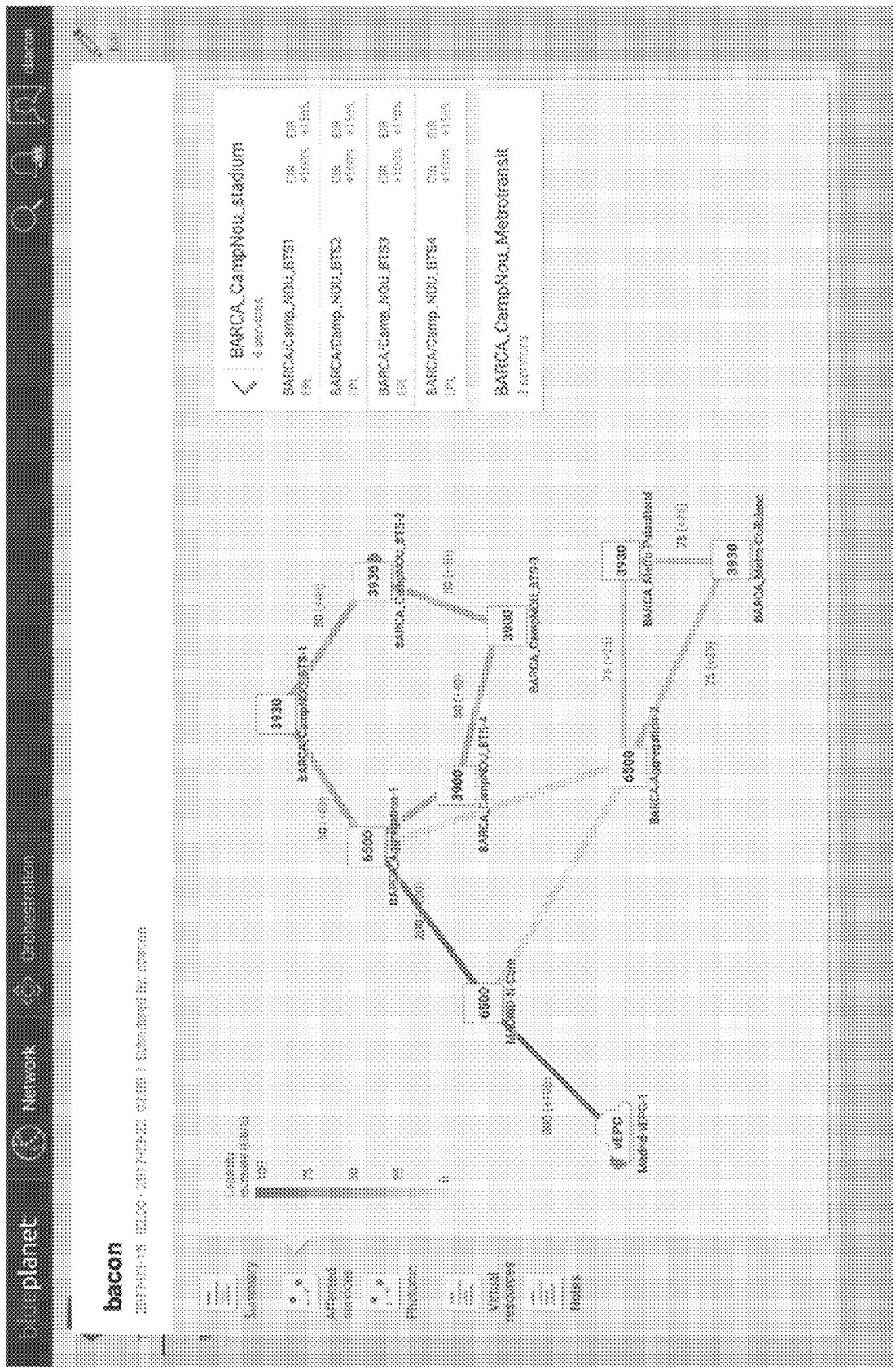
Figure 46:
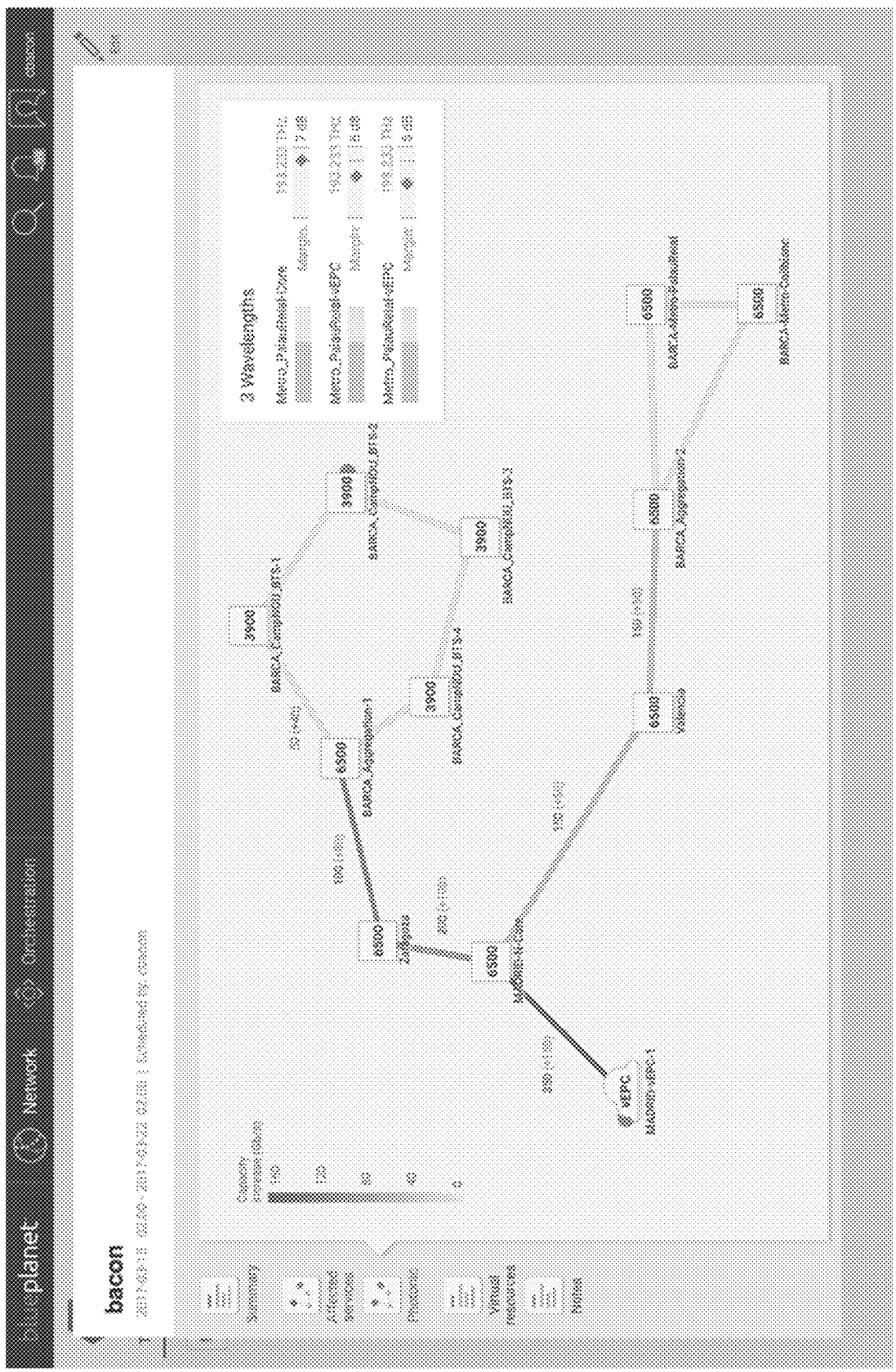

FIG. 44 is the UI of the summary metrics of the capacity increase event. It includes metrics such as: A) the supported subscribers in the extended configuration; B) the S/PGW-U throughput bitrates & Aggregated S1-U Bearer Capacity; C) how Orchestrate has first maxed out the MPLS network layer to accommodate the requested increase and then put the rest of the load on the Photonic network by employing Liquid Spectrum algorithms; and D) the new estimated VM resources need to support the capacity increase event. FIG. 45 is a network map of Affected Services for the capacity increase event; displaying the Mobile Access Services that will be adjusted to accommodate the requested capacity increase. FIG. 46 is a network map of Photonic Services displaying how the Photonic core will be adjusted, executing Liquid Spectrum, to accommodate the requested capacity increase.

Process for Manacling Optical Network Services

Figure 47:
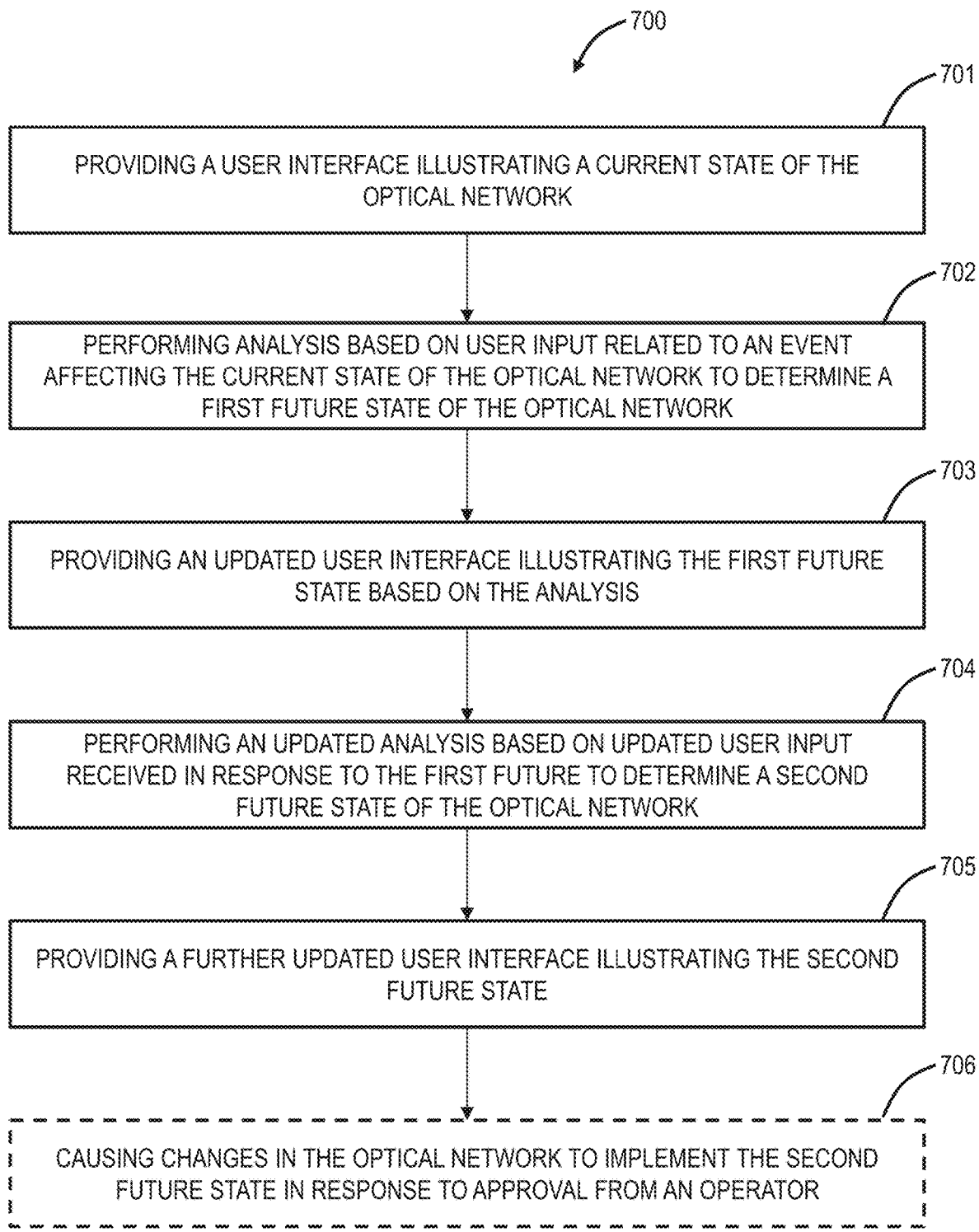
FIG. 47 is a flowchart of a computer-implemented process for managing optical network services in an optical network.

FIG. 47 is a flowchart of a computer-implemented process 700 for managing optical network services in an optical network. The computer-implemented process 700 includes providing a user interface illustrating a current state of the optical network (step 701); performing analysis based on user input related to an event affecting the current state of the optical network to determine a first future state of the optical network (step 702); providing an updated user interface illustrating the first future state based on the analysis (step 703); performing an updated analysis based on updated user input received in response to the first future to determine a second future state of the optical network (step 704); and providing a further updated user interface illustrating the second future state (step 705). The computer-implemented process 700 can further include causing changes in the optical network to implement the second future state in response to approval from an operator (step 706).

The first future state can have less optical margin in the optical network than the current state and the second future state can have less optical margin in the optical network than the first future state, and wherein an operator makes selections in the user input and the updated user input. The selections can be made to temporarily operate at the reduced optical margin based on the event and associated services affected by the event. The selections can be made based on a series of "what if" comparisons to explore excess capacity, services addressable by the excess capacity, and network conditions based on the excess capacity.

The analysis and the updated analysis can perform capacity mining to determine excess capacity available based on the user input and the updated user input. The excess capacity can be provided through configuration changes in existing optical modems in the optical network. The event can include one or more faults with the first future state including the optical network subsequent to restoration of all services. The updated user interface and the further updated user interface each can list a number of services restored and down based on the first future state and the second future state. The event can include scheduling intermittent capacity increases on one or more services in the optical network.

In another embodiment, an apparatus configured to manage optical network services in an optical network includes a processor; and memory storing instructions that, when executed, cause the processor to provide a user interface illustrating a current state of the optical network, perform analysis based on user input related to an event affecting the current state of the optical network to determine a first future state of the optical network, provide an updated user interface illustrating the first future state based on the analysis, perform an updated analysis based on updated user input received in response to the first future to determine a second future state of the optical network, and provide a further updated user interface illustrating the second future state.

In a further embodiment, a non-transitory computer-readable medium including instructions that, when executed, cause a processor to perform the steps of providing a user interface illustrating a current state of the optical network; performing analysis based on user input related to an event affecting the current state of the optical network to determine a first future state of the optical network; providing an updated user interface illustrating the first future state based on the analysis; performing an updated analysis based on updated user input received in response to the first future to determine a second future state of the optical network; and providing a further updated user interface illustrating the second future state.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium comprising instructions that, when executed, cause one or more processors to perform steps of:
   providing a user interface visualizing a current state of an optical network;
   receiving user inputs related to capacity mining in the optical network;
   determining a future state with the capacity mining based on the user inputs; and
   providing the user interface visualizing the future state.

2. The non-transitory computer-readable storage medium of claim 1, wherein the future state is presented with respect to a failed link and restoration of traffic on the failed link.

3. The non-transitory computer-readable storage medium of claim 2, wherein the future state includes a plurality of plans with a visualization showing how much of the traffic is restored based on different approaches to the capacity mining.

4. The non-transitory computer-readable storage medium of claim 1, wherein the user inputs include any of routing diversity, bandwidth requirements, service attributes, and reserve margin.

5. The non-transitory computer-readable storage medium of claim 1, wherein the future state includes forecasted or planned future services.

6. The non-transitory computer-readable storage medium of claim 1, wherein the steps include
causing configuration changes in the optical network responsive to user input.

7. The non-transitory computer-readable storage medium of claim 1, wherein the capacity mining is based on any of viability from a photonic perspective, margin availability, and capacity versus reach optimization.

8. The non-transitory computer-readable storage medium of claim 1, wherein the steps include
providing selections in the user interface for the receiving; and
performing the determining and the providing based on a user selection.

9. The non-transitory computer-readable storage medium of claim 1, wherein the steps include
providing selections in the user interface for specific services; and
performing the determining and the providing based on a user selection of any of the specific services.

10. The non-transitory computer-readable storage medium of claim 1, wherein the capacity mining includes configuring optical modems based on determined available excess capacity.

11. A method comprising steps of:
providing a user interface visualizing a current state of an optical network;
receiving user inputs related to capacity mining in the optical network;
determining a future state with the capacity mining based on the user inputs; and
providing the user interface visualizing the future state.

12. The method of claim 11, wherein the future state is presented with respect to a failed link and restoration of traffic on the failed link.

13. The method of claim 12, wherein the future state includes a plurality of plans with a visualization showing how much of the traffic is restored based on different approaches to the capacity mining.

14. The method of claim 11, wherein the user inputs include any of routing diversity, bandwidth requirements, service attributes, and reserve margin.

15. The method of claim 11, wherein the future state includes forecasted or planned future services.

16. The method of claim 11, wherein the steps include
causing configuration changes in the optical network responsive to user input.

17. The method of claim 11, wherein the capacity mining is based on any of viability from a photonic perspective, margin availability, and capacity versus reach optimization.

18. The method of claim 11, wherein the steps include
providing selections in the user interface for the receiving; and
performing the determining and the providing based on a user selection.

19. An apparatus comprising one or more processors and memory storing instructions that, when executed, cause the one or more processors to perform steps of:
providing a user interface visualizing a current state of an optical network;
receiving user inputs related to capacity mining in the optical network;
determining a future state with the capacity mining based on the user inputs; and
providing the user interface visualizing the future state.

20. The apparatus of claim 19, wherein the future state is presented with respect to a failed link and restoration of traffic on the failed link.

\* \* \* \* \*